(12) United States Patent
Maningat et al.

(10) Patent No.: US 8,309,152 B2
(45) Date of Patent: Nov. 13, 2012

(54) PROCESSES FOR PRODUCING WHEAT PROTEIN ISOLATES

(75) Inventors: Clodualdo C. Maningat, Platte City, MO (US); Li Nie, Kansas City, MO (US); Sukh D. Bassi, Atchison, KS (US); George A. Kelley, Atchison, KS (US); Edward E. Trompeter, Atchison, KS (US)

(73) Assignee: MGPI Processing Inc., Atchison, KS (US)

( * ) Notice: Subject to any disclaimer, the term of this patent is extended or adjusted under 35 U.S.C. 154(b) by 722 days.

(21) Appl. No.: 11/059,166

(22) Filed: Feb. 16, 2005

(65) Prior Publication Data

US 2005/0287267 A1    Dec. 29, 2005

Related U.S. Application Data

(60) Provisional application No. 60/583,051, filed on Jun. 25, 2004.

(51) Int. Cl.
*A21D 10/00* (2006.01)
(52) U.S. Cl. ........ 426/496; 426/549; 426/653; 426/656; 530/374; 530/375
(58) Field of Classification Search .................. 426/549, 426/496, 653, 656; 530/374, 375
See application file for complete search history.

(56) References Cited

U.S. PATENT DOCUMENTS

| | | | |
|---|---|---|---|
| 2,891,045 A | 6/1959 | Montgomery et al. | |
| 3,951,938 A * | 4/1976 | Kerkkonen et al. | 530/374 |
| 4,108,847 A * | 8/1978 | Creinin et al. | 530/374 |
| 4,478,856 A * | 10/1984 | Adler-Nissen et al. | 426/46 |
| 4,950,496 A * | 8/1990 | Schur | 426/656 |
| 5,164,013 A * | 11/1992 | Posner et al. | 127/67 |
| 5,849,090 A | 12/1998 | Haralampu et al. | |
| 5,885,819 A * | 3/1999 | Kofod et al. | 435/200 |
| 5,965,708 A * | 10/1999 | Bassi et al. | 530/374 |
| 6,261,454 B1 * | 7/2001 | van den Berge et al. | 210/326 |
| 6,261,629 B1 | 7/2001 | Mazza et al. | |
| 6,432,458 B1 | 8/2002 | Yamazaki et al. | |
| 6,589,584 B1 | 7/2003 | Stark | |

(Continued)

FOREIGN PATENT DOCUMENTS

EP    0 077 821 B    7/1986

(Continued)

OTHER PUBLICATIONS

International Search Report and the Written Opinion of the International Searching Authority for PCT/US04/16022 mailed May 21, 2004.

(Continued)

*Primary Examiner* — Anthony Weier
(74) *Attorney, Agent, or Firm* — Lathrop & Gage LLP

(57) ABSTRACT

Process equipment for the separation of gluten from wheat starch including gluten process equipment configured to process gluten after the gluten is initially separated from A starch, the gluten processing equipment having a dewatering press configured to dewater gluten and modified gluten process equipment including at least one component selected from the group having a high pressure water wash system located upstream of the dewatering press, a kneader located upstream of the dewatering press, a homogenizer located upstream of the dewatering press, a dispersion tank configured to precipitate fines downstream of the dewatering press, a solids-ejecting centrifuge downstream, and combinations thereof.

47 Claims, 14 Drawing Sheets

U.S. PATENT DOCUMENTS

2004/0192896 A1 * 9/2004 Finch ............................ 530/374

FOREIGN PATENT DOCUMENTS

GB          708 806 A     5/1954

OTHER PUBLICATIONS

Maningat, C. & Bassi, S.; Wheat Starch Production, Program Proceedings of the Int'l Starch Technology Conf., pp. 26-40 (University of Illinois, 1999).
PCT/US2005/004925 International Preliminary Report on Patentability and Written Opinion, Dec. 2006.
PCT/US2005/004925 International Search Report, mailed Sep. 20, 2005.
European Application EP 05 713 663.2 Communication pursuant to Article 96(2) EPC; Jun. 6, 2007; 4 pages.
European Application EP 05 713 663.2 Response to Jun. 6, 2007 Office Action; Oct. 24, 2007; 13 pages.
European Application No. 05 713 663 Decision to Grant dated Mar. 10, 2011, 2 pages.
European Application No. 05 713 663 Intention to Grant a European Patent dated Nov. 8, 2010, 60 pages.
European Application No. 05 713 663 Reply to Communication Pursuant to Article 94(3) EPC filed Jul. 16, 2010, 43 pages.
European Application No. 05 713 663 Communication Pursuant to Article 94(3) EPC dated Apr. 19, 2010, 3 pages.
European Application No. 05 713 663 Reply to Communication Pursuant to Article 94(3) EPC filed Sep. 25, 2009, 7 pages.
European Application No. 05 713 663 Communication Pursuant to Article 94(3) EPC dated May 25, 2009, 3 pages.
Japanese Patent Application No. 2007-518027, Rejection mailed Aug. 26, 2011, 10 pages.
Japanese Patent Application No. 2007-518027, Amended Claims filed with JPO on Apr. 20, 2011, 6 pages.
Japanese Patent Application No. 2007-518027, Rejection mailed Oct. 20, 2010, 18 pages.
Canadian Application No. 2,470,902, Office Action dated Mar. 23, 2009, 2 pages.
Canadian Application No. 2,470,902, Response to Office Action filed Sep. 23, 2009, 25 pages.
Canadian Application No. 2,470,902, Office Action dated May 27, 2011, 2 pages.
Japanese Patent Application No. 2007-518027, English Translation of amended claims filed with JPO on Feb. 24, 2012, 6 pages.
Japanese Patent Application No. 2007-518027,Notice of Allowance dated Mar. 22, 2012, 3 pages.
Canadian Application No. 2,470,902,Response to Examiners Report filed Nov. 28, 2011, 4 pages.
Canadian Application No. 2,470,902, Notice of Allowance dated May 30, 2012, 1 page.
Australian Application No. 2005267599, Examiner's First Report dated Jul. 14, 2008, 3 pages.
Australian Application No. 2005267599, Response to Examiner's Report, Mar. 26, 2010, 20 pages.
Australian Application No. 2005267599, patent certificate, Aug. 5, 2010, 1 page.

* cited by examiner

PROCESSES FOR PRODUCING WHEAT PROTEIN ISOLATES

RELATED APPLICATION

This application claims benefit of priority to U.S. Patent Application Ser. No. 60/583,051, filed Jun. 25, 2004 which is incorporated herein by reference.

BACKGROUND

1. Field of the Invention

The invention pertains to isolation of protein and starch constituents from wheat flour. More particularly, a methodology of isolation enhances the properties and protein content of isolated protein constituents.

2. Description of the Related Art

Wheat gluten is the natural water-insoluble protein portion of wheat endosperm which, during wet processing of wheat flour, is separated in the form of a protein-lipid-starch complex. Commercial wheat gluten has a mean composition of 72.5% protein (77.5% on dry basis), 5.7% total fat, 6.4% moisture and 0.7% ash; carbohydrates, mainly starches, are the other major component. The major protein fractions of wheat gluten consist of gliadin and glutenin which differ in their solubility properties and molecular weight.

Wheat gliadins consist of about 50 different single-chained proteins with molecular weights of 30,000-100,000 daltons. When isolated, gliadins are very sticky, which apparently is responsible for the cohesion property of wheat gluten. By contrast, glutenin proteins are multi-chained, polymerized by disulfide bonds, and larger in size with molecular weight of about 3,000,000 daltons. Upon isolation, glutenins exhibit resiliency but neither cohesion nor extensibility and, therefore, appear to give wheat gluten its elastic properties.

Wheat gluten is unique among cereal and other plant proteins because of its capacity to form a cohesive and viscoelastic mass suitable for breadmaking. The viscoelasticity appears to be because the gluten proteins are water compatible and, thus, will swell and interact. As water is taken up by wheat gluten, it goes through a glass transition where it changes from a hard glassy material to one that is rubbery and elastic. Wheat gluten is also unique in its ability to impart to wheat flour doughs the property to retain leavening gases. Other unique properties of wheat gluten are: appropriate balance in the content of gliadin and glutenin, unusually high content of the amino acid glutamine, and extreme polydispersity of its molecular weight. These unique properties define gluten's superior performance in a variety of products.

The uses of wheat gluten are wide-ranging and, during the last decade, its utilization has intensified. Although the uses of wheat gluten can vary from country to country, baking represents the predominant usage of wheat gluten, accounting for 63% of total usage worldwide. In the European Union, flour fortification ranks a close second to baking usage with pet food applications ranking third. The second leading use of wheat gluten worldwide and in North America and Australia is in pet foods. Baking, imitation meats/fish, and processed foods are the major uses of wheat gluten in Japan. In Japan, wheat gluten is also used for the preparation of bread known as "Fu" bread, for the production of monosodium glutamate as a seasoning agent, and for the preparation of gluten hydrolyzate for use as an extender for soy sauce called "Sho-yu". Wheat gluten also plays an important role in the creation of vegetarian food for the 309 million Buddhists worldwide and the 100 million Chinese Buddhists in which Chinese-style meat analogs have been made from wheat gluten by hand or simple extrusion.

As reported by Maningat and Bassi, *Wheat Starch Production*, Program Proceedings of the International Starch Technology Conference, pp. 26-40 (University of Illinois, 1999), which is incorporated by reference to the same extent as though fully disclosed herein, there are several processes for industrial production of wheat gluten, and they typically are named after the company or the person who developed or patented the process. These processes include: Martin, Batter, Hydrocyclone, Pillsbury Hydromilling, Modified "Fesca", Alkali, Far-Mar-Co. and Tricanter (also variously referred to as Wesffalia Centrifuge HD, Flottweg Tricanter, Barr & Murphy, or Decanter-Based Weipro).

Differences exist among these processes in terms of type of raw material (whole wheat vs. flour, hard wheat vs. soft wheat, etc.), dispersion procedure (water vs. chemical), consistency of wheat flour/water mixture (dough vs. batter), and equipment for starch and gluten separation (centrifuge vs. shaker screen vs. hydrocyclone vs. agitator/ribbon blender).

The Martin, Batter, Hydrocyclone, Raisio/Alfa-Laval and Tricanter processes are regarded as among the most popular manufacturing methods for wheat gluten production. The choice of a process to produce wheat gluten is dependent on a number of different factors. In order to produce wheat gluten, it is necessary to have three things: (a) a good source of raw material flour, (b) a way to process wheat starch that is a co-product in a ratio of up to 6 (starch) to 1 (gluten), and (c) a method of handling the effluent water from the gluten and starch manufacturing process. In cases where sub-quality flour is used, the use of the enzymes pentosanases and cellulases is recommended to improve gluten yield and starch recovery. Other important factors involved in the production of wheat gluten are the yield of wheat gluten, water balance, pH of flour slurry, the cost of a system from a capital standpoint, and the operating costs of the system.

Water consumption is a historical problem in the art. The Martin and Batter processes have historically used as much as 15 pounds of fresh water for every pound of flour that is processed, i.e., a ratio of 15:1. Disposing of this water volume in an ecologically effective way is difficult. Recycling of process water may reduce the ratio down to 6:1. Ratios for other processes include Hydrocyclone (4.5:1), Decanter (4:1), and High Pressure Disintegration (from 2:1 to 3:1).

Historically, the Martin process, developed in Paris in 1835, was among the earliest and most successful process for the recovery of wheat gluten. A flow diagram of the generalized Martin process is shown in FIG. 1 (discussed in detail below), but variations of this process are widely practiced. The Martin process utilized wheat flour as the starting raw material and water was added in a mixer to form a dough. The dough was allowed to develop so that it was thoroughly hydrated. It then would undergo an extraction step where more water was added to begin the separation process between the gluten and the starch. The dough washing step is designed to release the starch without dispersing or breaking up the gluten into small pieces. Sufficient water is used to wash the starch from the dough while it is kneaded or rolled; devices such as ribbon blenders, rotating drums, twin screw troughs, and agitator vessels have been designed for this purpose. The wet gluten would then be mechanically separated from the starch in rotating or vibratory screens to achieve a gluten with a protein content of 75% (dry basis). The major drawback to this system was the excessive use of water, as much as 10 to 1, which complicates starch recovery and presents a significant effluent problem which has to be addressed. Modifications of the process have been utilized in the industry for years.

The Batter process was invented in 1944. In this process, the batter is prepared by mixing flour and water to yield suspended curds of gluten from which the starch has been washed out. The curds are recovered on a gyrating screen and the starch milk passes through. The starch is refined through a series of screens, sieves and centrifuges, and dried as in the Martin process.

In the Hydrocyclone process, a batter formed with recycled wash water and flour is introduced directly into a series of hydrocyclones. The "A" starch is washed out directly with counter-current fresh water. Because of the intense fluid shear in the hydrocyclones, the gluten agglomerates into small curds rather than large lumps. The gluten curds can be washed and separated on a rotating washer screen. The main advantage of this process is its low usage of water. Older plants, based on the Martin or the Batter process, are being retrofitted with hydrocyclones to lower operating costs and almost eliminate effluent waste.

FIGS. 1-4 relate to various commercial processes that are used to separate wheat gluten form starch. It will be appreciated that the processes and process equipment have various commercial embodiments that may differ slightly as implemented in different commercial plants. The process goals are to provide wet processing of wheat flour in a manner that facilitates physical separation of gluten from starch materials on a density or sieve basis.

FIG. 1 is a block schematic diagram showing flow stream linkage of commercially available components combined in a manner that implements, generally, the Martin process 100. Process input feeds include milled wheat flour 102 and water 104, which a dough mixer 106, such as a pin mixer, combines in a ratio of 10 parts flour to 8 parts water by weight. A typical temperature for water 104 submitted to mixer 106 is 90° F. Mixer 106 discharges into a residence or maturation tank 108 where the dough rests while hydrating to completeness. With discharge from the maturation tank 108, an additional volume of water 110, for example, five parts by weight per unit of wheat flour 102, is introduced to the flow stream, and the combination is vigorously mixed in an agglomerator 112, which is for example a turbulator. The action of agglomerator 112 works on the flow stream to provide gluten as elastic curds bathed in a milky starch suspension. Agglomerator 112 discharges into a separating screen 114, such as a reel—an elongated and slanted hollow rotating cylinder typically equipped with 40 mesh screen. The portion of the flow stream that is the milky starch suspension passes through the separating screen 114, as isolated A starch 116 subject to downstream purification processes 118. The downstream processes may include conventional sieving to remove successively smaller gluten particles 120, centrifugation and/or hydrocyclone processing to concentrate the starch 122.

Separating screen 114 retains the gluten as a doughy mass. Optional water jets 124 positioned on the separating screen 114 may facilitate washing and discharge of the gluten from separating screen 114. Separating screen 114 discharges into a kneader 126, such as a conventional mixer. The action of kneader 126 releases starch from the gluten matrix. The starch is suspended in water, as so it is appropriate to dewater the gluten by suitable agents, such as a dewatering screen 128, which may be a second reel, followed by a dewatering press 130. By way of example, the dewatering press 130 may be a screw press.

The dewatered gluten flow stream may be submitted to a flash dryer 132 to yield wheat gluten 134. Alternatively, output from the dewatering press 130 may be processed without drying in flash dryer 132 to form wheat protein isolate, hydrolyzed wheat protein, deamidated wheat gluten, or other modified wheat gluten.

It will be appreciated that filtrate from the dewatering screen 128 may be submitted to B starch processes 136 for the isolation of B starch. Purified B starch is somewhat inferior to A starch and may in some instances be used for animal feed or as a feedstock for chemically modified starches.

FIG. 2 is a block schematic diagram showing flow stream linkage of commercially available components combined in a manner that implements, generally, the Hydrocyclone process 200. This is the dominant commercial process at the present time. Equipment advantages include compactness, less expense to install, lower water usage, and fewer moving parts. In FIG. 2, as in the drawings that follow, like numbering is retained with respect to identical conceptual system components shared with the Martin process equipment of FIG. 1 and other figures.

Residence time of dough in the maturation tank 108 persists for about 10 to 20 minutes. Maturation tank 108 discharges into a dispersion tank 202 The action of dispersion tank 202 differs from that of agglomerator 112 (shown in FIG. 1) because dispersion tank 202 uses less turbulence to mix the dough from maturation tank 202 with water 110 and form a uniform suspension, as opposed to the formation of gluten curds in agglomerator 112. Dispersion tank 202 discharges into a multistage hydrocyclone system 204 that may be equipped with a rotary strainer to remove larger agglomerates which can plug the cyclones. By way of example, the hydrocyclone system 204 may be a fifteen-stage hydrocyclone.

Wheat gluten has a density of 1.1 g/cc, whereas starch has a density of 1.4 g/cc. The hydrocyclone system 204 operates on this density difference to separate the gluten from the starch suspension 206. Gluten is collected as overflow and starch is collected as underflow. The starch suspension 206 may be purified by downstream processes 208, such as sieving, further hydrocyclone processing to concentrate the starch suspension 206, and drying to yield wheat starch.

Spontaneous agglomeration of gluten occurs in the hydrocyclone system 204 due to the shear forces that inherently affect the flow stream in hydrocyclone system 204. Hydrocyclone system 204 discharges into a washing screen 210. The washing screen 210 may be an inclined static screen, which is used to separate the gluten from B starch, bran, and cell wall materials. Further refinement of gluten proceeds through dewatering screen 128, dewatering press 130, and flash dryer 132 as discussed in context of FIG. 1.

FIG. 3 is a block schematic diagram showing flow stream linkage of commercially available components combined in a manner that implements, generally, the Alfa-Laval/Raisio process 300. Flour 102 and water 104 are mixed in ratios that form a thick batter, which is thinner than a dough. A batter mixer 302, such as a pin mixer, which discharges into a disc disintegrator 304. The disc disintegrator operates on the batter to form a substantially homogenous suspension of starch, protein and other components. A decanter centrifuge 306 separates the protein or gluten fraction 308 from the starch fraction 310. The gluten fraction 308 typically has about 40% protein and the starch fraction 310 about 1% protein at this point. The gluten fraction is discharged into a maturation tank 312, which is equipped with a slow speed agitator that builds clots or threads of gluten. A disc disintegrator 314 completes the gluten agglomeration by forming lumps that can be separated from the flow stream and discharges into a vibrating screen 316. The vibrating screen 316 separates the gluten from bran and starch 318. A dewatering press 130, such as a screw press, removes water from the gluten, which may then be optionally flash dried in a flash drier 132 to yield wheat gluten.

The prime starch fraction 310 is processed by rotating conical screens 324 to remove fibers. A first decanter 326 washes the flow stream in countercurrent mode, and a second decanter 328 concentrates the starch, which usually has a protein concentration of about 0.3% when submitted to drier 330.

B starch 318 is rich in starch and solubles, which are recovered using a decanter 332. A nozzle or solids-ejecting centrifuge 334 concentrates the B starch to about 25% solids. A dewatering device 336, such as a decanter centrifuge, further dewaters the B starch 318 prior to discharge into a drier 338. Solubles 340 discharged from centrifuge 334 may be dried using a drier 342.

FIG. 4 is a block schematic diagram showing flow stream linkage of commercially available components combined in a manner that implements, generally, Tricanter process 400, which is alternatively known in the art as the Wesffalia Centrifuge HD process, Flottweg Tricanter process, Barr & Murphy process, or Decanter-Based Weipro process. Mixer 106 combines flour 102 and water 104 in ratios that form a dough. The dough is pumped into a high intensity homogenizer 402 that imposes sufficient shear forces on the dough to disintegrate the gluten-starch matrix, forming an emulsion. A three-phase decanter 404 separates this emulsion into an A starch stream 406, a gluten plus B starch stream 408, and a pentosans and solubles stream 410. The three-phase decanter may be, for example, a horizontal, conical bowl centrifuge equipped with a screw conveyor, as is known in the art.

The A starch stream 406 typically contains less than 1% protein. An eight stage hydrocyclone 412, washes and concentrates the A starch stream 406. Fiber removal is accomplished using a combination of rotary and static screens 414, followed by further concentration using a three stage hydrocyclone 416. A dewatering device 418 provides further concentration, followed by submission to a drier 420. The gluten and B starch stream 408 is processed through a rotary screen 422 to remove the gluten, which is transferred to a rotary washer 424. A dewatering screw press 130 removes water from the recovered gluten, which is then submitted to flash drier 132.

Filtrate from the rotary screen 422 contains A starch and B starch. The filtrate travels to a disc bowl separator 430, which separates the A starch from the B starch. The A starch is submitted to the eight stage hydrocyclone 412 to obtain a nearly complete A starch recovery. The rotary cone screens 432 sift the bran/starch stream to remove fiber 434. A nozzle separator 436 preconcentrates the B starch, which is followed by further dewatering in decanter 438 to provide concentrated B starch 440.

The early separation of pentosan and solubles stream 410 beneficially concentrates the A starch stream 406 and the gluten and B starch stream 408, while also reducing the viscosity of these other streams. Total effluent wastes from process 400 are, consequently, reduced. Fine gluten remaining in the pentosan and solubles stream 410 is removed by gluten screen 442 and provided to the rotary gluten washer 424. Filtrate from gluten screen 442 travels to rotary cone screens 444 for clarification and subjected to drying in an evaporator 446.

The process equipment schematics of FIGS. 1-4 produce, generally, a wheat gluten 134 having a protein content of 75% minimum (dry basis). As previously indicated, wheat gluten that contains 77.5% protein (dry basis), 5.7% total fat, 6.4% moisture, and 0.7% ash, has contaminants of 9.7% by weight. These contaminants may include, typically, B starch, bran and/or fibers. Contaminants of this magnitude may affect organoleptic qualities of the wheat gluten, particularly when the wheat gluten is processed to make vegetarian snacks and/or treats. Shelf life may also be affected when the contaminants include starch, which tends to adsorb atmospheric water.

SUMMARY

The claims at the close of this specification set forth a full and accurate description of applicant's successful solution to the problems discussed above. To the extent consistent with those claims, applicant states that he has developed at least the following:

The instrumentalities described herein overcome the problems outlined above and advance the art by providing process improvements that facilitate improved protein content of recovered gluten (wheat protein isolate) and recover increased quantities of gluten protein, as compared to prior art processes. These improvements may be accomplished on an industrial or commercial scale. Furthermore, any one of various commercial processes in use today may be adapted to incorporate these improvements. The recovered wheat protein isolate typically has protein content greater than 90% (Nx6.25, dry basis). Process equipment for the separation of gluten from starch, as described above, includes gluten process equipment that is hereby defined to be equipment downstream of a point where a gluten flow stream is initially separated from a starch flow stream. A typical component of gluten processing equipment is a dewatering press or station. The gluten process equipment may be improved by the addition of components including a high pressure water wash system located upstream of the dewatering press, a kneader located upstream of the dewatering press, a homogenizer located upstream of the dewatering press, a dispersion tank configured to precipitate fines downstream of the dewatering press, a centrifuge located downstream of the dewatering press, and combinations thereof.

The aforementioned process modifications or improvements may be made to a number of systems for producing gluten. They may, for example, be made to accommodate any of the Martin process, the Batter process, the Hydrocyclone process, the Alfa Laval/Raisio process or the Tricanter process, among others.

Processes that fall within the scope of this application, in summary, include these:
1. A process for producing wheat protein isolate comprising the following steps: mixing flour with water; separating the gluten from the mixture; dewatering the gluten; pressing the gluten; creating a dispersion of the gluten; and spray drying the dispersed gluten.
2. A process for producing wheat protein isolate comprising the following steps: mixing flour with water; separating the gluten from the mixture; dewatering the gluten; kneading the gluten; dewatering the gluten; pressing the gluten; and flash drying the gluten.
3. A process for producing wheat protein isolate comprising the following steps: mixing flour with water; separating the gluten from the mixture; dewatering the gluten; homogenizing the gluten; dewatering the gluten; pressing the gluten; and flash drying the gluten.
4. A process for producing wheat protein isolate comprising the following steps: mixing flour with water; separating the gluten from the mixture; dewatering the gluten; pressing the gluten; creating a dispersion of the gluten; separating the gluten from the dispersion in a centrifuge; and spray drying the gluten.

5. A process for producing wheat protein isolate comprising the following steps: mixing flour with water; separating the gluten from the mixture; dewatering the gluten; pressing the gluten; creating a dispersion of the gluten; dewatering the gluten; pressing the gluten; and flash drying the gluten.

Applicable process equipment for the separation of gluten from wheat starch includes gluten process equipment having a dewatering press configured to dewater gluten and modification of the gluten process equipment to include at least one component selected from the group consisting of a high pressure water wash system located upstream of the dewatering press, a kneader located upstream of the dewatering press, a homogenizer located upstream of the dewatering press, a dispersion tank configured to precipitate fines downstream of the dewatering press, a centrifuge located downstream of the dewatering press, and combinations thereof.

DETAILED DESCRIPTION OF EMBODIMENTS

The following discussion teaches by way of example, not by limitation, and so should not be unduly construed to narrow the scope of invention as defined by the claims that follow.

It has been discovered that modifications to the gluten flow stream process equipment can significantly improve the purity of processed wheat gluten. The modifications generally include the installation of additional process equipment to perform additional washing and kneading. High pressure washing of gluten is currently not practiced and is hereby defined as a stream of water exiting a nozzle under a pressure of at least 80-100 psi discharged within 12-18 inches of the screen. This pressure range is only a general guide and is intended to accomplish the function of dislodging additional B starch material and other contaminants advantageously without having sufficient force to disassociate gluten curds that are being collected on the screen. Conventional washes, by way of comparison, either do not exist in the positions shown below or operate at lower pressures ranging from 5-15 psi.

Figure 1:
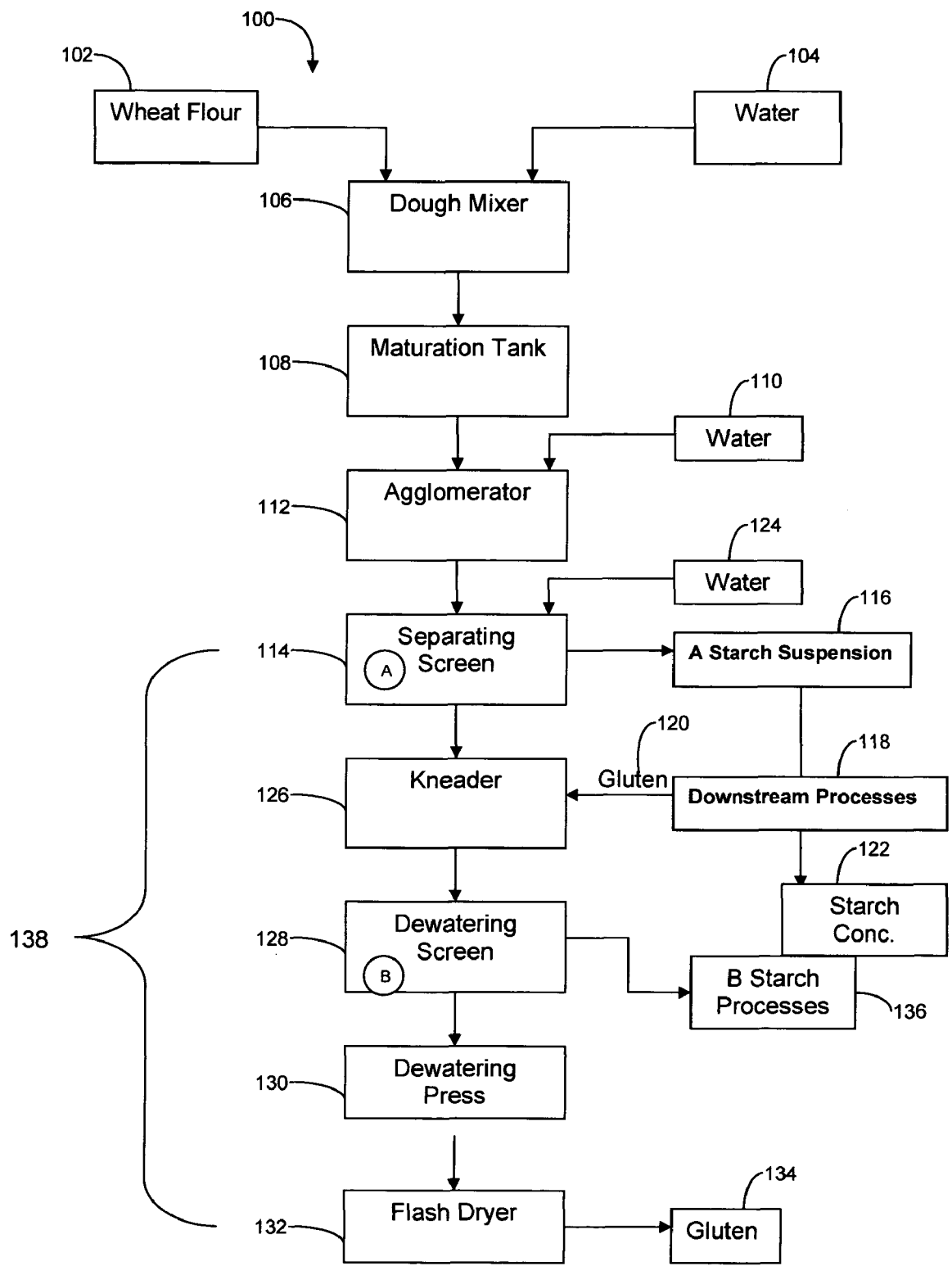
FIG. 1 is a schematic diagram illustrating system components for the modified Martin process of separating wheat gluten from starch.
Figure 2:
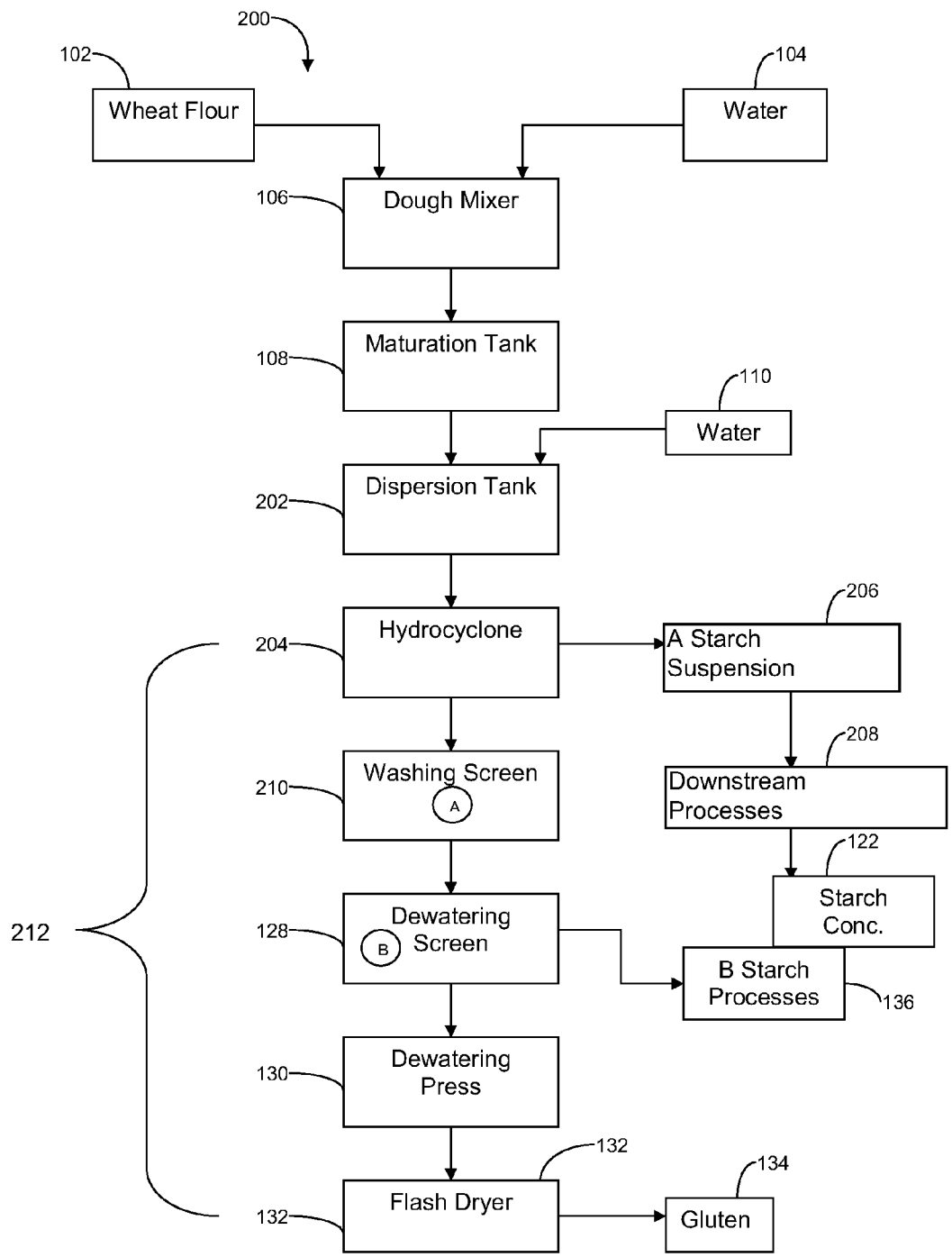
FIG. 2 is a schematic diagram illustrating system components for the Hydrocyclone process of separating wheat gluten from starch.
Figure 3:
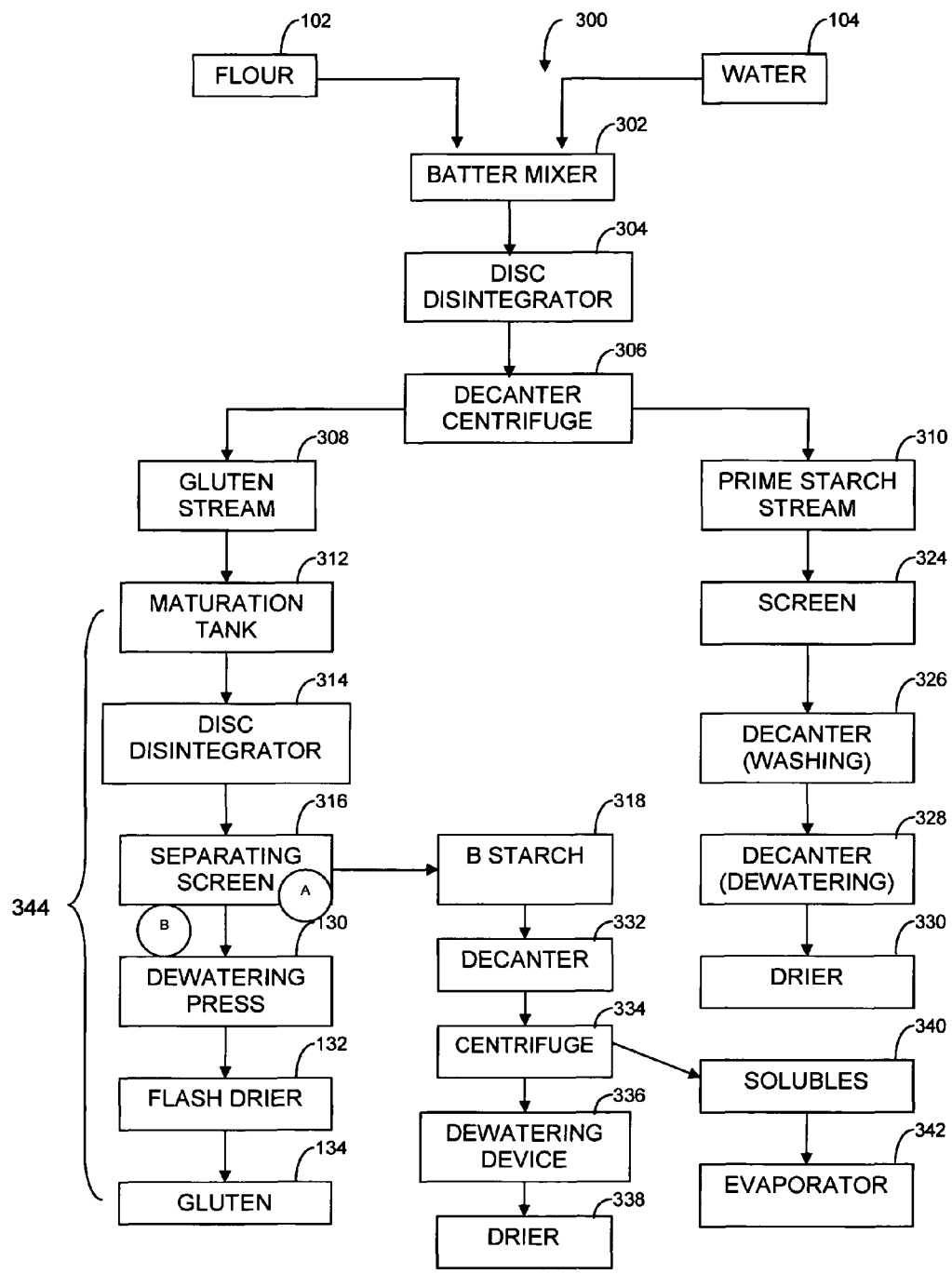
FIG. 3 is a schematic diagram illustrating system components for the Alfa-Laval/Raisio process of separating wheat gluten from starch.
Figure 4:
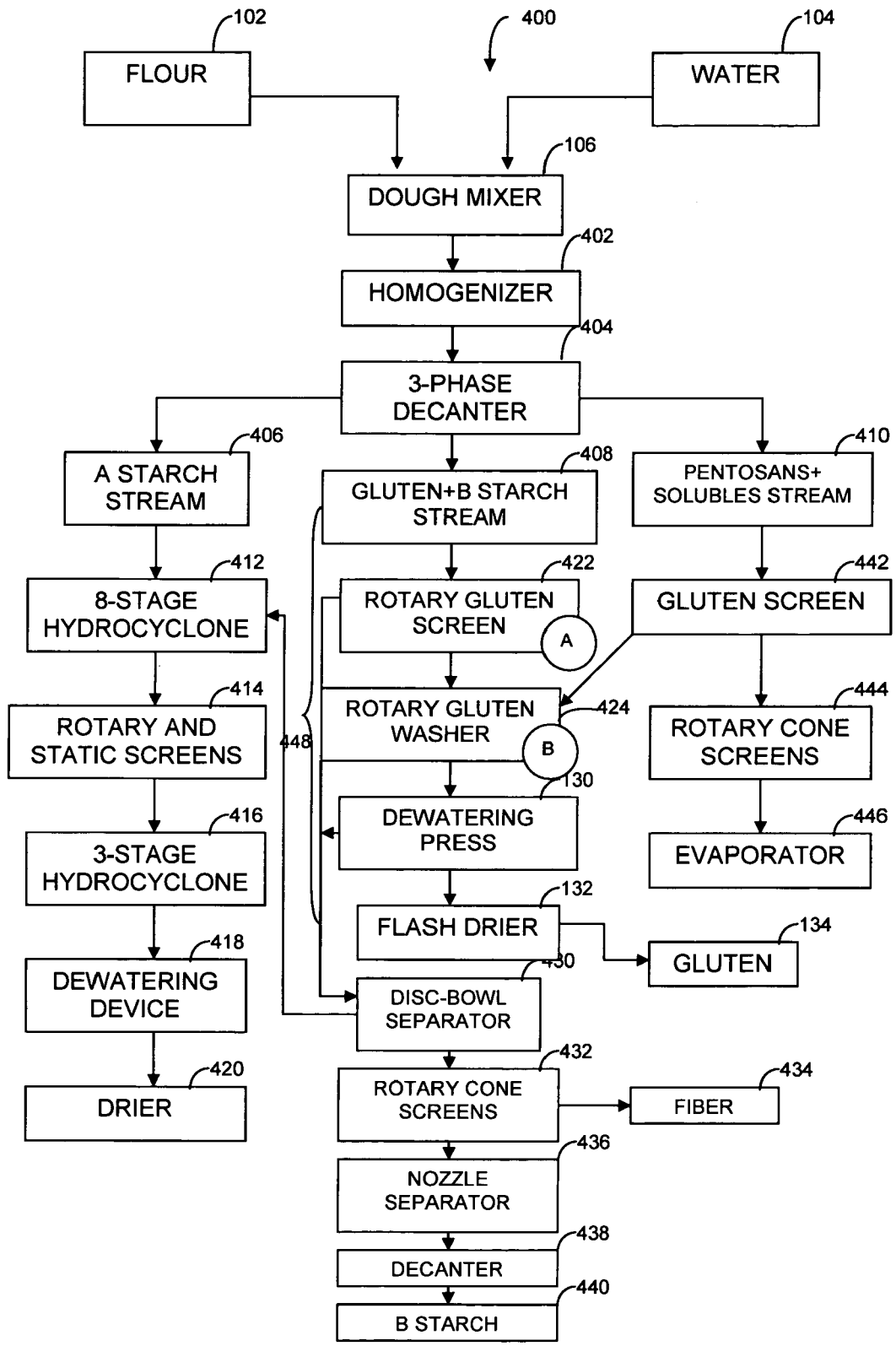
FIG. 4 is a schematic diagram illustrating system components for the Tricanter process of separating wheat gluten from starch.

A review of FIGS. 1-4 reveals that each figure shares the commonality of gluten process equipment tailored for a gluten flow stream. By way of example, gluten process equipment 138 includes separating screen 114, kneader 126, dewatering screen 128, dewatering press 130, and flash drier 132. In FIG. 2, gluten process equipment 212 includes hydrocyclone 204, washing screen 210, dewatering screen 128, dewatering press 130, and flash drier 132. In FIG. 3, gluten process equipment 344 includes maturation tank 312, disc disintegrator 314, separating screen 316, dewatering press 130, and flash drier 132. In FIG. 4, gluten process equipment 448 includes rotary gluten screen 422, rotary gluten washer 424, dewatering press 130, and flash drier 132.

Figure 5:
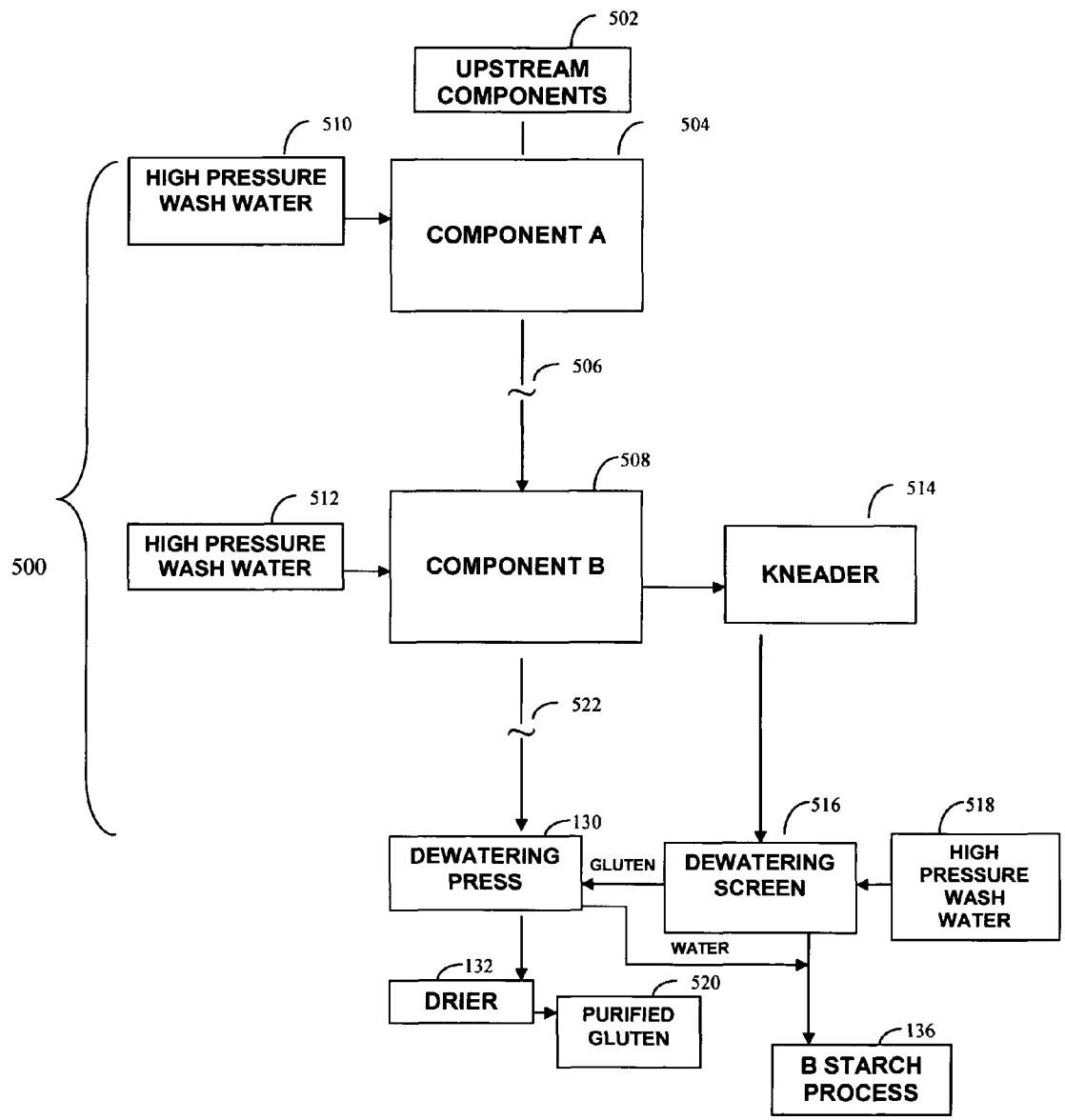
FIG. 5 is a schematic diagram illustrating process enhancements that may be used to yield wheat protein isolate in the process equipment shown in any one of FIGS. 1-4 by high pressure water washing and/or additional kneading.

FIG. 5 is a generic diagram applicable to modification of any of the gluten process equipment 138, 212, 344, or 448 that is illustrated in FIGS. 1-4. More particularly, modified gluten process equipment 500 is installed downstream of upstream components 502 and entails the first conventional screen separator in the gluten process equipment 138, 212, 344, 448 that separates gluten from A or B starch. In some conventional processes there is no such separating screen and so the equipment may be modified to add a separating screen that discharges into B starch flow processes 136. By way of example, component A 504 is labeled with a circle-A in each of FIGS. 1-4 where applicable and includes separating screen 114 (FIGS. 1 and 3), washing screen 210 (FIG. 2), or rotary gluten screen 422 (FIG. 4). A break 506 indicates that additional process equipment may be installed in a conventional manner between component A 504 and component B 508. Component B 508 includes the last dewatering station (including separating or wash stations) just prior to dewatering press 130 (in conventional process equipment) and is located suitably with a circle-B in each of FIGS. 1-4. For example, component B 508 includes dewatering stations in the form of dewatering screen 128 (FIG. 1) and rotary gluten washer 424 (FIG. 4).

Conventional process equipment in FIG. 3 does not have an identifiable, separable component B, but a dewatering screen 114 may be suitably added as indicated by the circle-B between the separating screen 114 and the dewatering press 130 thereof to effect process modifications.

According to system modifications illustrated in FIG. 5, a first high pressure water wash discharges into component A to dislodge contaminants from the gluten flow stream. A second high pressure water wash 512 similarly discharges into component B to further dislodge contaminants. Component B discharges into an additional kneader 514. Kneader 514 discharges into a dewatering screen 516, which separates gluten from water and other contaminants. A third high pressure water stream 518 is provided to further dissociate contaminants at dewatering screen 516. Whether one, two or all of the high-pressure water streams are utilized is a matter of choice depending on the process conditions. From dewatering screen 516, the gluten transfers to dewatering press 130 and the water may be submitted to recycle or B starch processes 136 (generally the B starch flow stream). The foregoing modifications provide a purified gluten or wheat protein isolate 520 of higher quality than gluten 134. Dashed line 522 indicates an optional process bypass avoiding kneader 514 and sequential processing in the event that high purity gluten or wheat protein isolate 520 is not required and regular gluten 134 will suffice.

Figure 6:
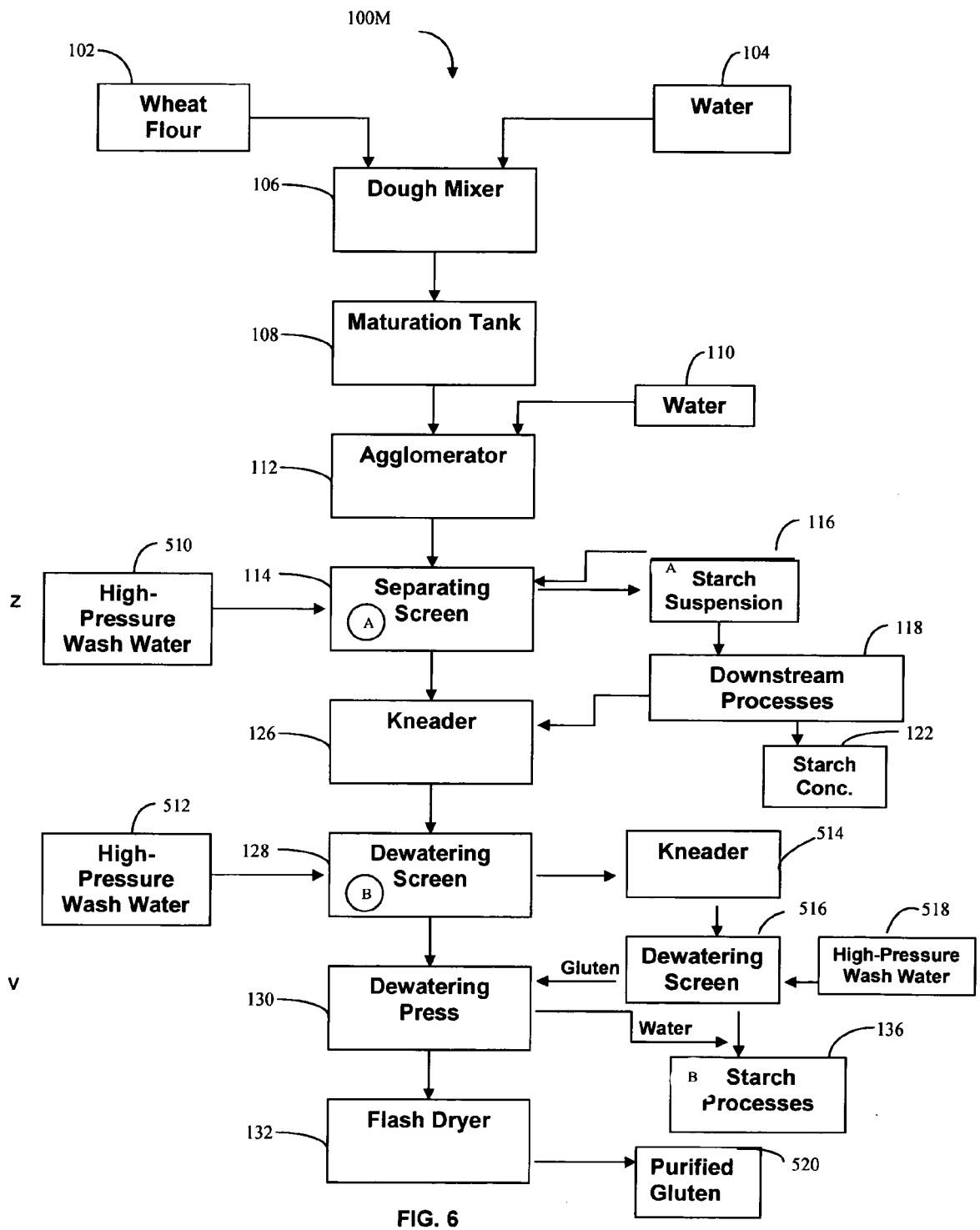
FIG. 6 demonstrates the process enhancements shown in FIG. 5 as an embodiment installed on the process equipment of FIG. 1.
Figure 7:
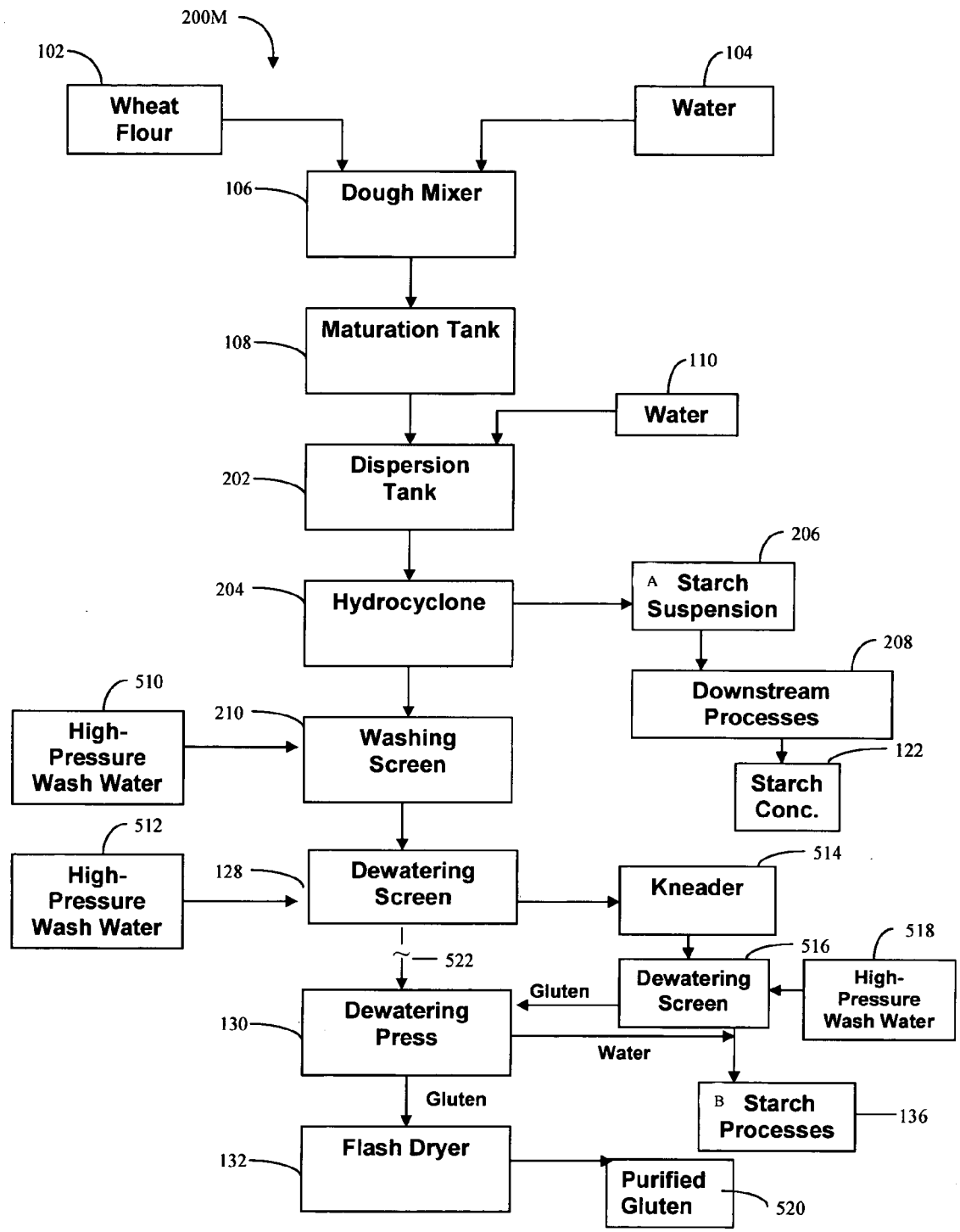
FIG. 7 demonstrates the process enhancements shown in FIG. 5 as an embodiment installed on the process equipment of FIG. 2.

FIGS. 6 and 7 illustrate the instrumentalities of FIG. 5 as actual modifications to the Martin process (FIG. 6—compare to FIG. 1) and the Hydrocyclone process (FIG. 7—compare to FIG. 2). The Alfa-Laval/Raisio process and the Tricanter process may be modified in an identical manner at component A 504 and component B 508, as described in connection with FIG. 5.

Figure 8:
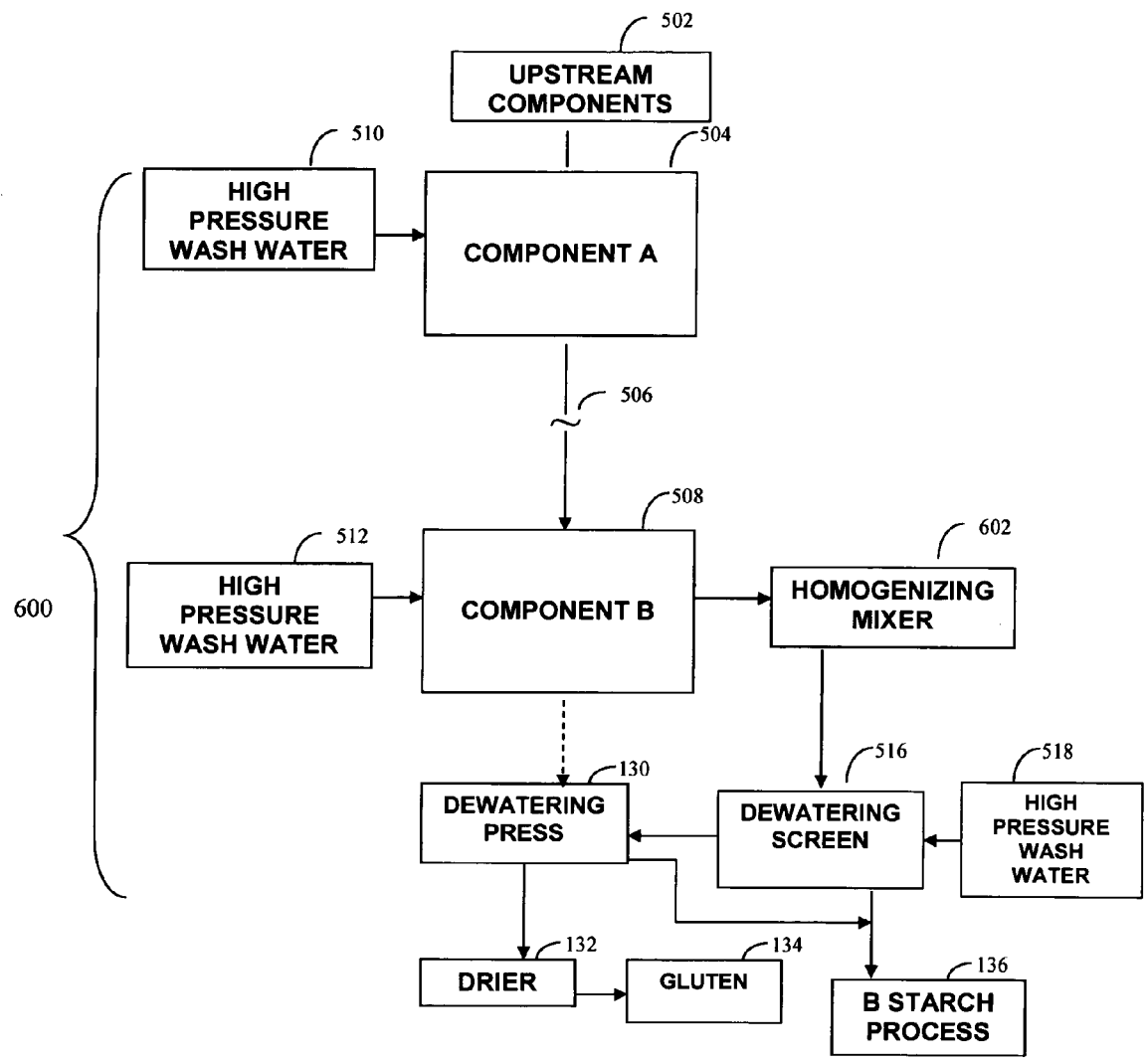
FIG. 8 demonstrates an alternative to the process enhancements of FIG. 5 wherein a homogenizing mixer is substituted for a kneader.

FIG. 8 illustrates a second embodiment of modified gluten process equipment 600. Modified gluten process equipment 600 is identical to modified gluten process equipment 500, except that a homogenizing mixer 602 is installed in place of kneader 514. A typical homogenizing mixer cuts, chops, and shears the gluten into tiny particles, and promotes complete dispersion. Other types of homogenizing mixer chops the gluten into small pieces and forces the particles into a set of screen that releases the starch from the protein matrix, and aligns the protein into fiber-like structures. Finally, the "cold extruded" mass is dewatered to re-agglomerate the protein.

Figure 9:
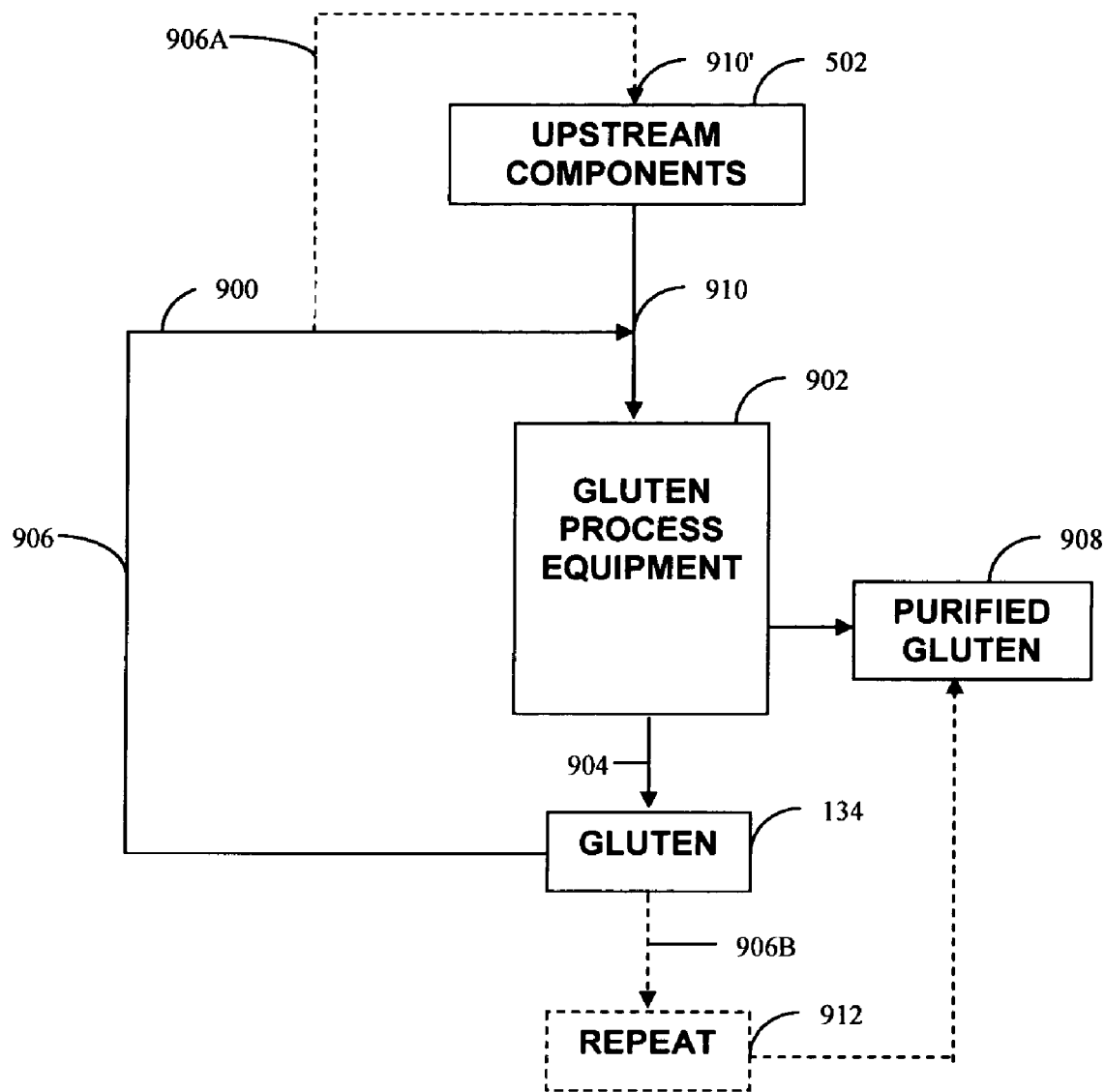
FIG. 9 shows additional process enhancements including a process recycle or repeat that may be used in place of or as a supplement to the process enhancements of FIGS. 5 and 8.

FIG. 9 illustrates yet another embodiment, namely, process recycle or repeat 900. The gluten 134 may be recycled through any one of gluten process equipment 138, 212, 344, or 448, which are generally denoted as gluten process equipment 902 in FIG. 9. This recycle may be used periodically to upgrade overall purity of the gluten. A dashed line 904 is closed after a first run yielding gluten 134. Gluten 134 travels on conveyance 906 for the recycle to yield purified gluten or wheat protein isolate 908 having improved quality and elevated protein content as compared to gluten 134.

A number of variations may occur as to positioning of recycle loop 906. By way of example, loop 906 need not discharge downstream of upstream components 502 at locus 910 and may, instead, discharge gluten 134 sequentially through all of the process equipment 100, 200, 300 or 400 commencing at locus 910' via loop option 906A. Line 906B is not a recycle loop because repeat 912 indicates the absence of loop 906 in a case where upstream components and/or gluten process equipment 902 is duplicated downstream of gluten 908. Line 906B and repeat 912 avoid the necessity of occupying process equipment 902 for gluten purification processes to the exclusion of other processing.

Figure 10:
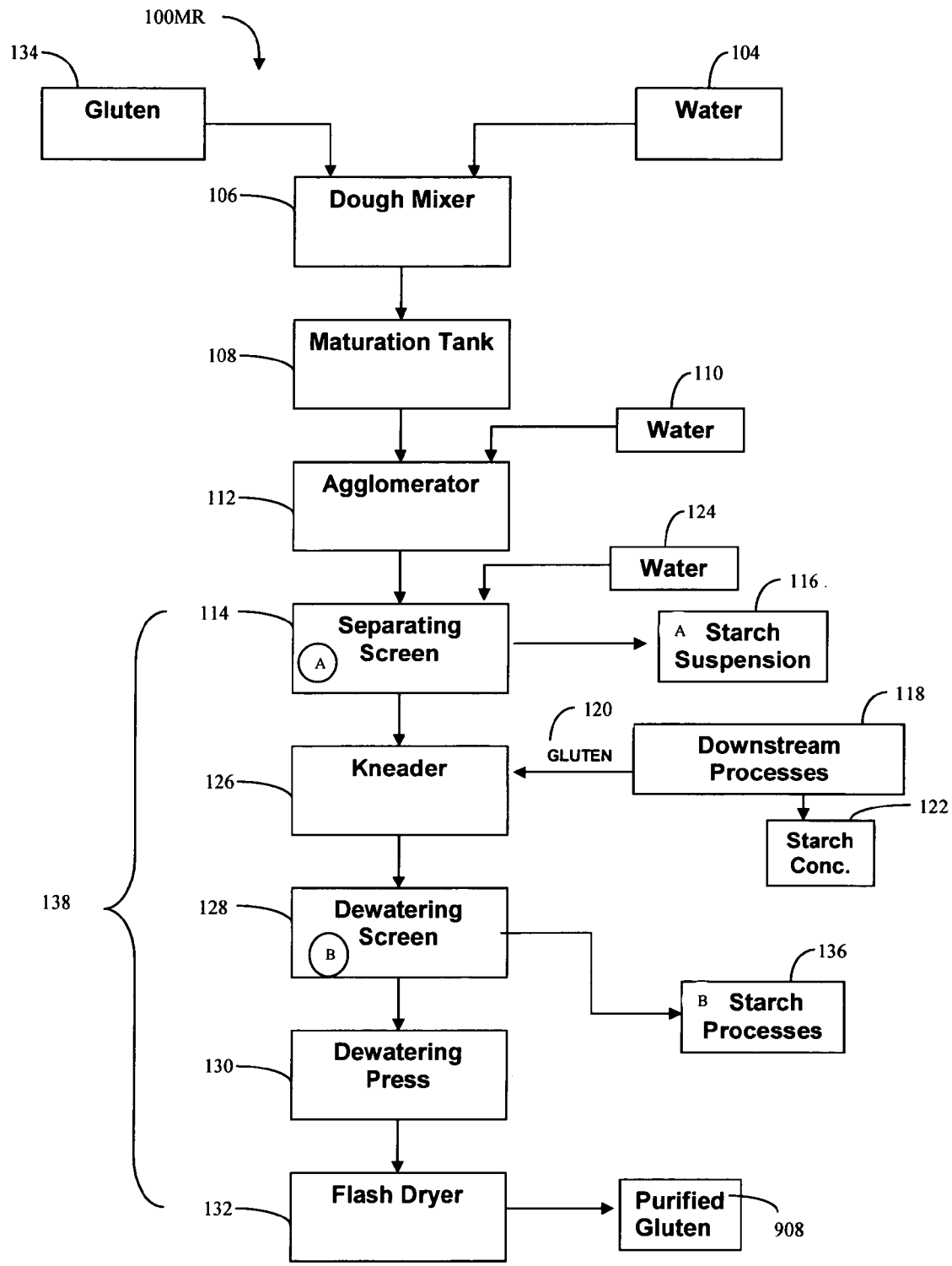
FIG. 10 demonstrates the process enhancements of FIG. 9 as they may be implemented on the process equipment of FIG. 1.

FIG. 10 illustrates one embodiment of the instrumentalities shown in FIG. 9 in the form of modified Martin process equipment 100MR. Gluten 134 from any one of process equipment 100, 200, 300 or 400 may be submitted to modified Martin process equipment 100MR, resulting in purified gluten or wheat protein isolate 908.

Figure 11:
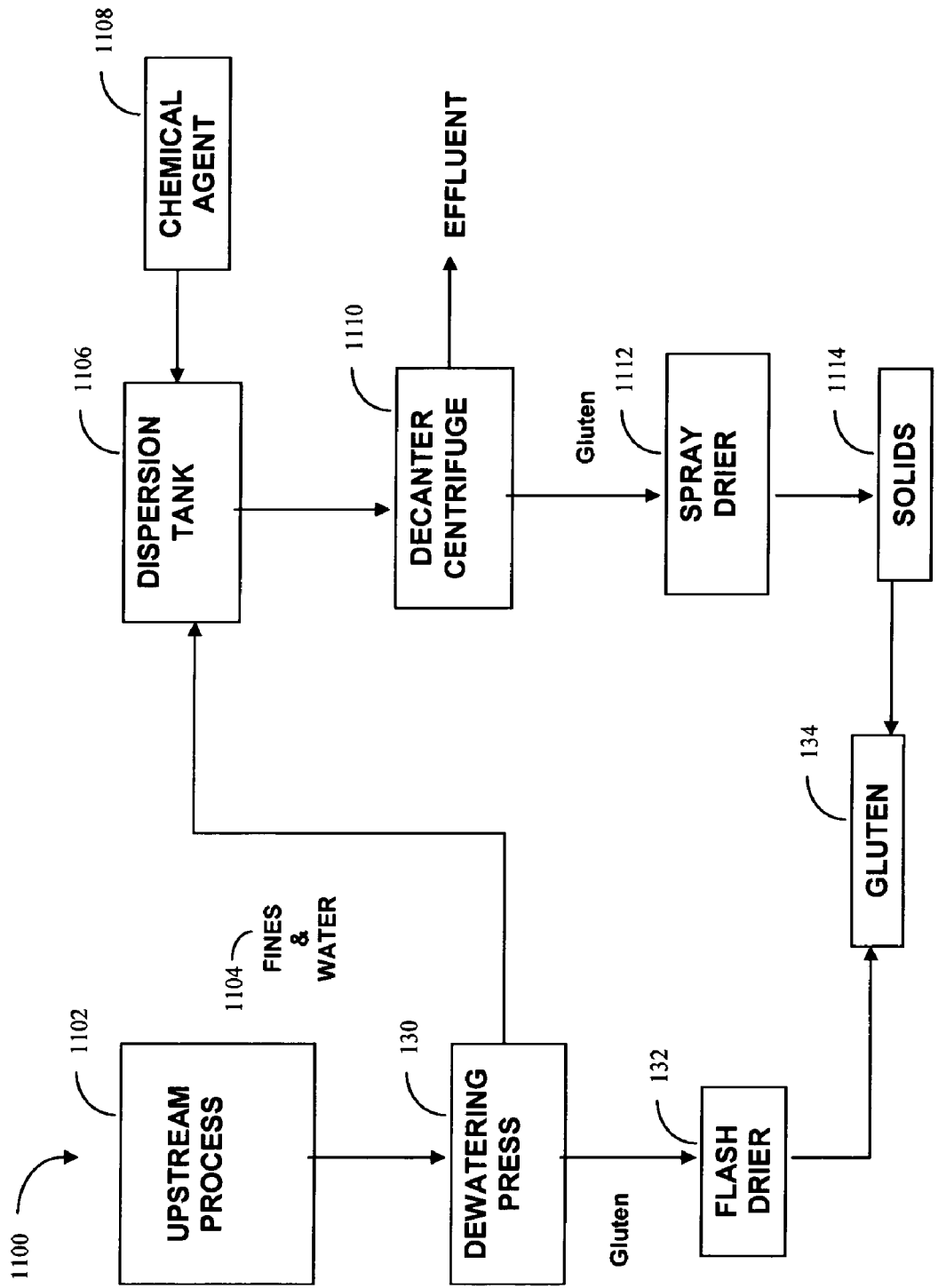
FIG. 11 illustrates further process enhancements that may be implemented on the process equipment shown in any one of FIGS. 1-10 to include chemical precipitation of gluten fines.

It will be appreciated that each variety of process equipment 100, 200, 300, 400, share a dewatering press 130. FIG. 11 illustrates modified process equipment 1100 wherein upstream process 1102 represents any components of process equipment 100, 200, 300, 400 upstream of dewatering press 130. Wet gluten coming out of the dewatering press is transferred to a dispersion tank 1106 equipped with a homogenizing mixer. The dispersion process is facilitated by adding water (10-16% gluten solids) and adjusting the pH to 3.8-4.2 using mineral or organic acids, or adjusting to pH 10.0-11.5 using ammonia solution. Other chemical additives such as reducing compounds, oxidizing compounds, emulsifiers, surfactants, sucrose esters, or enzymes may be added. The above acids, ammonia solution, and other chemical additives represent the chemical agent 1108. A solids-ejecting centrifuge 1110 may separate gluten and other solids from liquid effluent. The gluten and other solids may be dried using a spray drier 1112 to yield solids 1114. Where the solids 1114 contain gluten of sufficient purity (>90% protein, Nx6.25, dry basis), these may be recombined with gluten 134. It will be appreciated that gluten 134, as shown in FIG. 11, may also be gluten of higher purity including purified 520 or 908 where the modified process equipment 1100 is installed on modified process equipment 500, 900 shown in FIGS. 5 and 9.

Figure 12:
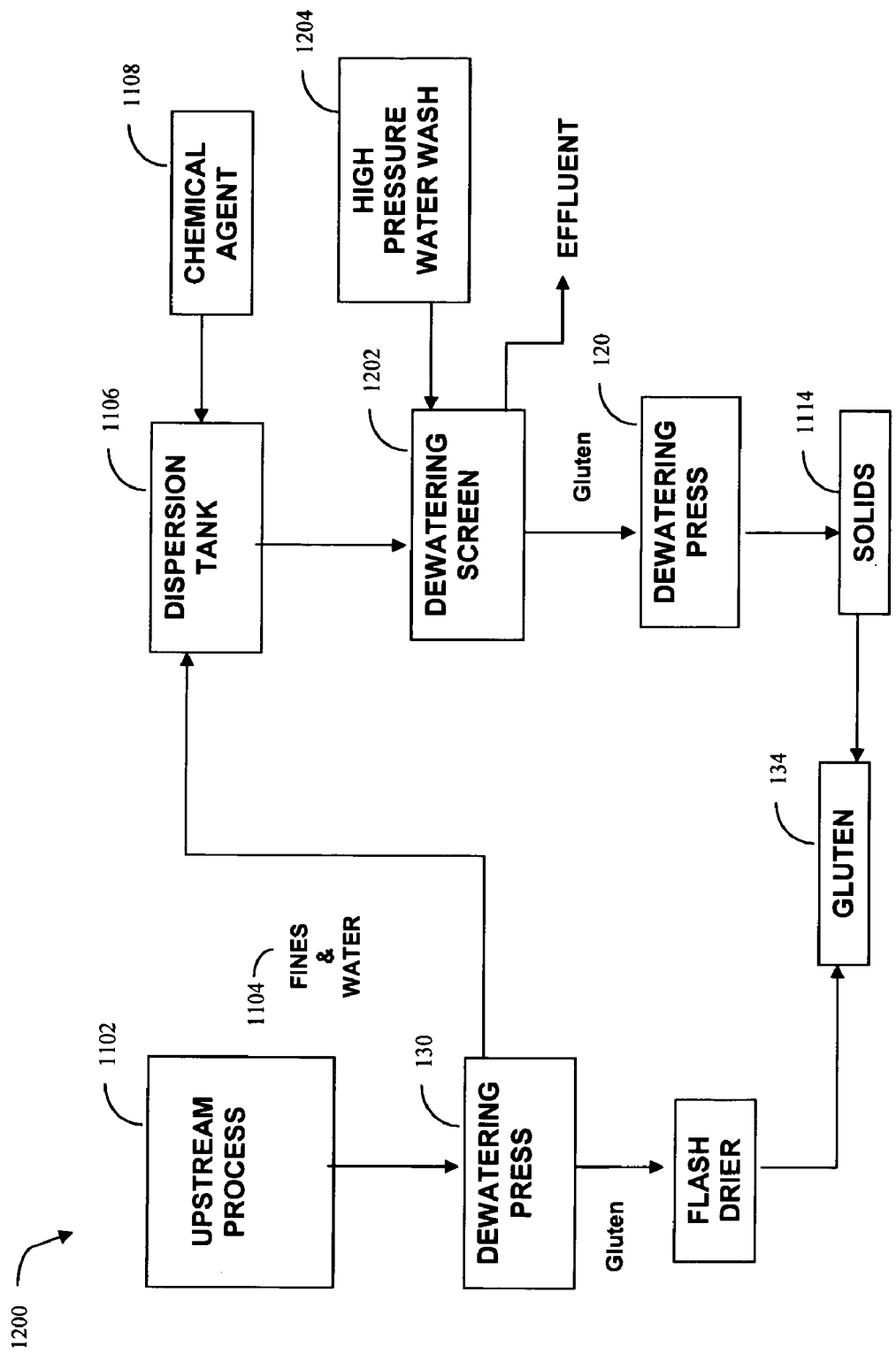
FIG. 12 illustrates alternative modifications that may be made to the enhancements shown in FIG. 11.

FIG. 12 illustrates modified process equipment 1200 that may be used to provide a similar recovery of wheat protein isolate in like manner with respect to process equipment 1100 shown in FIG. 11. The gluten dispersion prepared according to FIG. 11 by addition of chemical agents was further treated with a chemical precipitating agent, which may be a pH adjuster such as mineral or organic acids, or ammonia solution. pH adjustment to 6.0-7.0 precipitates or agglomerates the gluten into a doughy mass releasing the starch and other non-protein components into the aqueous phase. In modified process equipment 1200, a dewatering screen 1202 replaces the solids-ejecting centrifuge 1110. An optional high pressure water wash facilitates removal of chemical agents and non-gluten contaminants. A dewatering press 120 provides gluten of improved quality (>90% protein, Nx6.25, dry basis) as described in the context of FIG. 11.

EXAMPLES

Example 1

A manufacturing plant was equipped with industrial scale equipment set up in the manner shown schematically in FIG. 6. Components included commercially available equipment. Water and wheat flour feeds were respectively processed at 19,200 lbs per hour and 24,000 lbs per hour. High pressure water washes 510, 512, and 518 were each applied using water at 80-100 psi discharging through a spray nozzle positioned 12-18 inches from the screen. Gluten yield was 2,880 lbs per hour. Assay of the gluten product showed that the purified gluten (wheat protein isolate) had a protein content of greater than 90% by weight (Nx6.25, dry basis). Process water consumption was 4-5 lbs of water per pound of flour feed.

Example 2

A manufacturing plant was equipped with industrial scale equipment set up in the manner shown schematically in FIG.

7. Components included commercially available equipment. Water and wheat flour feeds were respectively processed at 14,400 lbs per hour and 18,000 lbs per hour. High pressure water washes 510, 512, and 518 were each applied using water at 80-100 psi discharging through a spray nozzle positioned 12-18 inches from the screen. Gluten yield was 2,160 lbs per hour. Assay of the gluten product showed that the purified gluten (wheat protein isolate) had a protein content greater than 90% by weight (Nx6.25, dry basis). Process water consumption was 5-6 lbs of water per pound of flour feed.

Example 3

Figure 13:
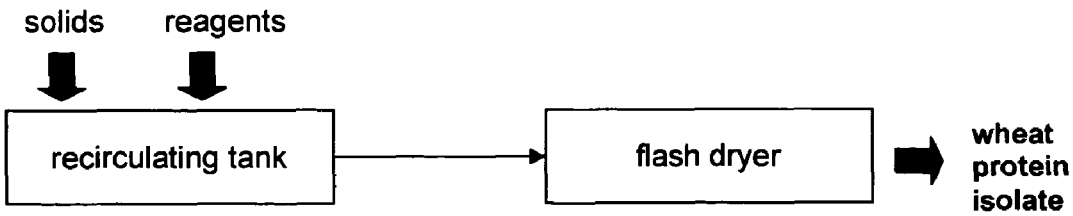
FIG. 13 depicts schematically further process improvements using a recirculating tank and a spray dryer.

1. The process configuration used in this Example is illustrated schematically in FIG. 13.
2. 2,500 lbs. of re-agglomerated protein (30-33% solids) from Step 3 of Example 28, wet gluten from the dewatering press (130) of FIGS. 5-10, or wet gluten from the dewatering press (120) of FIG. 12 was transferred to a tank with a recirculating pump.
3. Lactic acid (5 lbs.) and acetic acid (5 lbs.) were added to the tank.
4. The mixture was recirculated for 1 hour, or until the doughy mass of protein is liquefied.
5. Sodium metabisulfite (0.2-1.0 lbs.), sodium ascorbate (0.2-1.0 lbs.), and sugar ester (5-9 lbs.) were added.
6. The recirculation process was continued for 90 minutes.
7. The slurry was then flash-dried into a wheat protein isolate powder with greater than 90% protein content (Nx6.25, dry basis), and pH of 4.0-4.5.

Example 4

1. The process configuration used in this Example is illustrated schematically in FIG. 13.
2. 2,800 lbs. of re-agglomerated protein (30-33% solids) from Step 3 of Example 28, wet gluten from the dewatering press (130) of FIGS. 5-10, or wet gluten from the dewatering press (120) of FIG. 12 was transferred to a tank with a recirculating pump.
3. Lactic acid (36.5 lbs.) was added to the tank.
4. The mixture was recirculated for 1 hour, or until the doughy mass of protein is liquefied.
5. Sodium metabisulfite (1-3 lbs.) was then added.
6. The recirculation process was continued for 90 minutes.
7. The slurry was then flash-dried into a wheat protein isolate powder with greater than 90% protein content (Nx6.25, dry basis), and pH of 4.0-4.5.
8. The wheat protein isolate power was mixed with 1-5% of alkaline powder, which can be from sodium hydroxide, sodium carbonate, sodium bicarbonate or phosphate salts.
9. Blend the mixture thoroughly. This wheat protein isolate powder has a neutral pH (6.0-7.0), and a protein content greater than 85% (Nx6.25, dry basis).

Example 5

1. The process configuration used in this Example is illustrated schematically in FIG. 13.
2. 2,800 lbs. of re-agglomerated protein (30-33% solids) from Step 3 of Example 28, wet gluten from the dewatering press (130) of FIGS. 5-10, or wet gluten from the dewatering press (120) of FIG. 12 was transferred to a tank with a recirculating pump.
3. Lactic acid (36.5 lbs.) was added to the tank.
4. The mixture was recirculated for 1 hour, or until the doughy mass of protein is liquefied.
5. Sodium metabisulfite (1-3 lbs.) was then added.
6. The recirculation process was continued for 90 minutes.
7. The slurry was then flash-dried into a wheat protein isolate powder with greater than 90% protein content (Nx6.25, dry basis), and pH of 4.0-4.5.

Example 6

Figure 14:
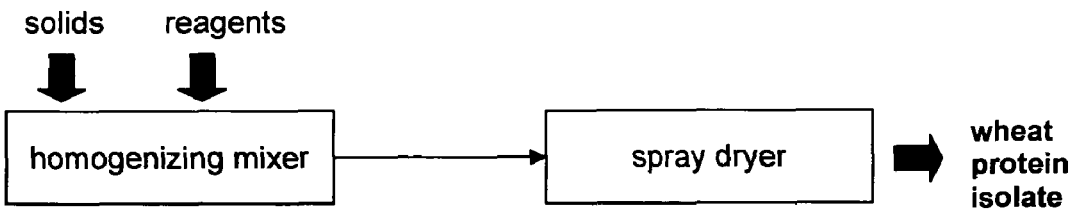
FIG. 14 depicts schematically further process improvements using a homogenizing mixer.

1. The process configuration used in this Example is illustrated schematically in FIG. 14.
2. 350 gallons of water (95° F.) was transferred to a tank equipped with a homogenizing mixer.
3. 5 lbs. of lactic acid and 5 lbs. of acetic acid were added (pH 3.8-4.2).
4. The homogenizing mixer was turned on.
5. 2,500 lbs. of re-agglomerated protein (30-33% solids) from Step 3 of Example 28, wet gluten from the dewatering press (130) of FIGS. 5-10, or wet gluten from the dewatering press (120) of FIG. 12 was added to the lactic acid solution.
6. Around 20-45 minutes was allowed for complete dispersion of gluten.
7. Sodium metabisulfite (0.2-1.0 lbs.), sodium ascorbate (0.2-1.0 lbs.), and sugar ester (5-9 lbs.) were added.
8. The dispersion was mixed for 1 hour.
9. The homogeneous suspension was spray dried into a wheat protein isolate powder with greater than 90% protein content (Nx6.25, dry basis), and pH of 4.0-4.5.

Example 7

1. The process configuration used in this Example is illustrated schematically in FIG. 14.
2. Water (300 gallons, 95° F.) was transferred to a tank equipped with a homogenizing mixer.
3. Ammonium hydroxide or ammonia water (0.2% based on wet gluten) was added to adjust the pH to 10-11.
4. 2,600 lbs. of re-agglomerated protein (30-33% solids) from Step 3 of Example 28, wet gluten from the dewatering press (130) of FIGS. 5-10, or wet gluten from the dewatering press (120) of FIG. 12 was added.
5. The homogenizing mixer was turned on.
6. Approximately 20-45 minutes was allowed for complete dispersion of protein.
7. Sodium metabisulfite (0.2-1.0 lbs.) and sodium ascorbate (1-3 lbs.) were added to the homogeneous suspension.
8. The mixture was mixed for 1 hour.
9. The dispersion was then spray-dried into a wheat protein isolate powder with protein content greater than 90% (Nx6.25, dry basis), and pH of 5.0-7.0.

Example 8

1. The process configuration used in this Example is illustrated schematically in FIG. 14.
2. Water (422 gallons, 95° F.) was transferred to a tank equipped with a homogenizing mixer.
1. Ammonium hydroxide or ammonia water (0.2% based on wet gluten) was added to adjust the pH to 10-11.
2. 2,500 lbs. of re-agglomerated protein (30-33% solids) from Step 3 of Example 28, wet gluten from the dewatering press (130) of FIGS. 5-10, or wet gluten from the dewatering press (120) of FIG. 12 was added to the ammonium hydroxide (ammonia water) solution.

3. The homogenizing mixer was turned on.
4. Approximately 20-45 minutes was allowed to completely disperse the gluten.
5. Sodium metabisulfite (0.2-1.0 lbs.) was added to the homogeneous suspension.
6. The mixture was mixed for 1 hour.
7. The dispersion was spray-dried into a wheat protein isolate powder with greater than 90% protein content (Nx6.25, dry basis), and neutral pH (5.0-7.0).

Example 9

1. The process configuration used in this Example is illustrated schematically in FIG. 14.
2. Water (422 gallons, 95° F.) was transferred to a tank equipped with a homogenizing mixer.
3. Ammonium hydroxide or ammonia water (0.2% based on wet gluten) was added to adjust the pH to 10-11.
4. 2,500 lbs. of re-agglomerated protein (30-33% solids) from Step 3 of Example 28, wet gluten from the dewatering press (130) of FIGS. 5-10, or wet gluten from the dewatering press (120) of FIG. 12 was added to the ammonium hydroxide (ammonia water) solution.
5. The homogenizing mixer was turned on.
6. Approximately 20-45 minutes was allowed to completely disperse the gluten.
7. The homogeneous dispersion was spray-dried into a wheat protein isolate powder with protein content greater than 90% protein (Nx6.25, dry basis), and neutral pH (5.0-7.0).

Example 10

1. The process configuration used in this Example is illustrated schematically in FIG. 14.
2. 275 gallons of water (95° F.) was transferred to a tank equipped with a homogenizing mixer.
3. 36.5 lbs. of lactic acid (88%) was added (pH 3.8-4.2).
4. The homogenizing mixer was turned on.
5. 2,800 lbs. of re-agglomerated protein (30-33% solids) from Step 3 of Example 28, wet gluten from the dewatering press (130) of FIGS. 5-10, or wet gluten from the dewatering press (120) of FIG. 12 was added to the lactic acid solution.
6. Around 20-45 minutes was allowed for complete dispersion of gluten.
7. Sodium metabisulfite (1-3 lbs.) was added, and the dispersion was mixed for 60 minutes.
8. The dispersion was spray-dried into a wheat protein isolate powder with greater than 90% protein (Nx6.25, dry basis), and pH ranging from 4.0-4.5.
9. To the wheat protein isolate powder, add 1-5% of alkaline powder, which can be from sodium hydroxide, sodium carbonate, sodium bicarbonate or phosphate salts.
10. Blend the mixture thoroughly. This wheat protein isolate powder has a neutral pH (6.0-7.0), and a protein content greater than 85% (Nx6.25, dry basis).

Example 11

1. The process configuration used in this Example is illustrated schematically in FIG. 14.
2. 240 gallons of water (95° F.) was transferred to a tank equipped with a homogenizing mixer.
3. 36.5 lbs. of lactic acid (88%) was added (pH 3.8-4.2).
4. The homogenizing mixer was turned on.
5. 2,800 lbs. of re-agglomerated protein (30-33% solids) from Step 3 of Example 28, wet gluten from the dewatering press (130) of FIGS. 5-10, or wet gluten from the dewatering press (120) of FIG. 12 was added to the lactic acid solution.
6. Around 20-45 minutes was allowed for complete dispersion of gluten.
7. Sodium metabisulfite (1-3 lbs.) was added, and the dispersion was mixed for 60 minutes.
8. The dispersion was spray-dried into a wheat protein isolate powder with greater than 90% protein (Nx6.25, dry basis), and pH ranging from 4.0-4.5.

Example 12

Figure 15:
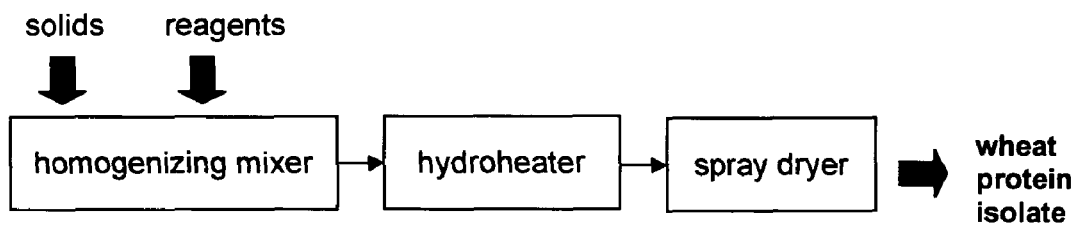
FIG. 15 depicts schematically further process improvements using a homogenizing mixer, a hydroheater and a spray dryer.

1. The process configuration used in this Example is illustrated schematically in FIG. 15.
2. Hot water (420 gallons, 120-130° F.) was transferred to a tank equipped with a homogenizing mixer.
3. Lactic acid (11.5 lbs) was added.
4. The homogenizing mixer was turned on.
5. 2,100 lbs. of re-agglomerated protein (30-33% solids) from Step 3 of Example 28, wet gluten from the dewatering press (130) of FIGS. 5-10, or wet gluten from the dewatering press (120) of FIG. 12 was added.
6. Approximately 20-45 minutes was allowed to completely disperse the gluten.
7. 1.5 lbs. of Liquipanol enzyme (papain) was added.
8. The mixture was stirred for 1 hour.
9. The dispersion was passed through a hydroheater (200-210° F., 20-minute retention time) to deactivate the enzyme
10. The dispersion was then spray-dried into a wheat protein isolate powder with protein content greater than 90% (Nx6.25, dry basis), and pH of 4.0-4.5.

Example 13

1. The process configuration used in this Example is illustrated schematically in FIG. 15.
2. Hot water (280 gallons, 120-130° F.) was transferred to a tank equipped with a homogenizing mixer.
3. 50% sodium hydroxide solution (11 lbs.) was added.
4. The homogenizing mixer was turned on.
5. 3,500 lbs of re-agglomerated protein (30-33% solids) from Step 3 of Example 28, wet gluten from the dewatering press (130) of FIGS. 5-10, or wet gluten from the dewatering press (120) of FIG. 12 was added.
6. Approximately 20-45 minutes was allowed to completely disperse the gluten.
7. 4.5 lbs. of Alcalase enzyme and 7.0 lbs. of Protamex enzyme were added to the slurry.
8. The mixture was stirred for 1 hour.
9. The dispersion was passed through a hydroheater (200-210° F., 20-minute retention time) to deactivate the enzymes.
10. The dispersion was then spray-dried into a wheat protein isolate powder with protein content greater than 90% (Nx6.25, dry basis), and pH of 4.5-6.5).

Example 14

1. The process configuration used in this Example is illustrated schematically in FIG. 15.
2. Hot water (210 gallons, 120-130° F.) was transferred to a tank equipped with a homogenizing mixer.

3. Ammonium hydroxide or ammonia water (0.2% based on wet gluten) was added to adjust the pH to 10-11.
4. The homogenizing mixer was turned on.
5. 3,500 lbs. of re-agglomerated protein (30-33% solids) from Step 3 of Example 28, wet gluten from the dewatering press (130) of FIGS. 5-10, or wet gluten from the dewatering press (120) of FIG. 12 was added.
6. Approximately 20-45 minutes was allowed to completely disperse the gluten.
7. Alcalase enzyme (10 lbs.) was added.
8. The dispersion was mixed for 1 hour.
9. The dispersion was passed through a hydroheater (200-210° F., 20-minute retention time) to deactivate the enzyme.
10. The slurry was then spray-dried into a wheat protein isolate powder with protein content greater than 90% (Nx6.25, dry basis), and pH of 4.5-6.5.

Example 15

Figure 16:
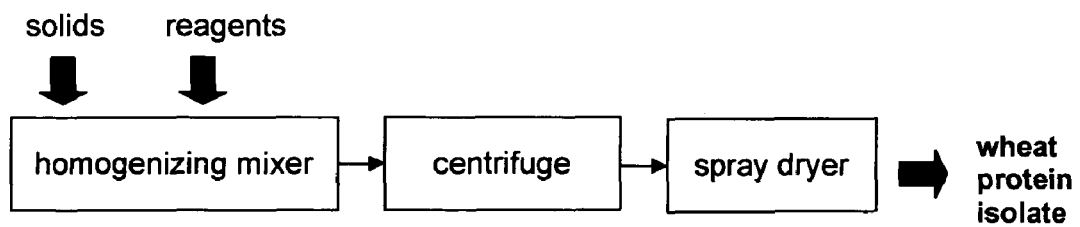
FIG. 16 depicts schematically further process improvements using a homogenizing mixer, a centrifuge and a spray dryer.

1. The process configuration used in this Example is illustrated schematically in FIG. 16.
2. 240 gallons of water (950F) was transferred to a tank equipped with a homogenizing mixer.
3. 36.5 lbs. of lactic acid (88%) was added (pH 3.8-4.2).
4. The homogenizing mixer was turned on.
5. 2,800 lbs. of wet gluten (30-33% solids) from the dewatering press (130) of FIGS. 1-4 was added. The homogenizing mixer cuts, chops, and shears the gluten into tiny particles.
6. Around 20-45 minutes was allowed for complete dispersion of gluten.
7. Sodium metabisulfite (1-3 lbs.) was added, and the dispersion was mixed for 60 minutes.
8. The dispersion was then pumped into a solids-ejecting centrifuge to separate the high-protein centrate from the dense residue rich in starch and other non-protein components.
9. The centrate was spray-dried into a wheat protein isolate powder with greater than 90% protein (Nx6.25, dry basis) and pH ranging from 4.0-4.5.

Example 16

1. The process configuration used in this Example is illustrated schematically in FIG. 16.
2. 275 gallons of water (95° F.) was transferred to a tank equipped with a homogenizing mixer.
3. 36.5 lbs. of lactic acid (88%) was added (pH 3.8-4.2).
4. The homogenizing mixer was turned on.
5. 2,800 lbs. of wet gluten (30-33% solids) from the dewatering press (130) of FIGS. 1-4 was added. The homogenizing mixer cuts, chops, and shears the gluten into tiny particles.
6. Around 20-45 minutes was allowed for complete dispersion of gluten.
7. Sodium metabisulfite (1-3 lbs.) was added, and the dispersion was mixed for 60 minutes.
8. The dispersion was then pumped into a solids-ejecting centrifuge to separate the high-protein centrate from the dense residue rich in starch and other non-protein components.
9. The centrate was spray-dried into a wheat protein isolate powder with greater than 90% protein (Nx6.25, dry basis) and pH ranging from 4.0-4.5.
10. To the wheat protein isolate powder, add 1-5% of alkaline powder, which can be from sodium hydroxide, sodium carbonate, sodium bicarbonate or phosphate salts.
11. Blend the mixture thoroughly. This wheat protein isolate powder has a neutral pH (6.0-7.0), and a protein content greater than 85% (Nx6.25, dry basis).

Example 17

1. The process configuration used in this Example is illustrated schematically in FIG. 16.
2. Water (422 gallons, 95° F.) was transferred to a tank equipped with a homogenizing mixer.
3. Ammonium hydroxide or ammonia water (0.2% based on wet gluten) was added to adjust the pH to 10-11.
4. 2,500 lbs. of wet gluten (30-33% solids) from the dewatering press (130) of FIGS. 1-4 was added.
5. The homogenizing mixer was turned on.
6. Approximately 20-45 minutes was allowed to completely disperse the gluten.
7. The homogenous suspension was pumped into a solids-ejecting centrifuge where the high-protein centrate was separated from the dense residue containing starch and other non-protein components.
8. The centrate was spray-dried into a wheat protein isolate powder with protein content greater than 90% protein (Nx6.25, dry basis), and neutral pH (5.0-7.0).

Example 18

1. The process configuration used in this Example is illustrated schematically in FIG. 16.
2. Water (422 gallons, 95° F.) was transferred to a tank equipped with a homogenizing mixer.
3. Ammonium hydroxide or ammonia water (0.2% based on wet gluten) was added to adjust the pH to 10-11.
4. 2,500 lbs. of wet gluten (30-33% solids) from the dewatering press (130) of FIGS. 1-4 was added.
5. The homogenizing mixer was turned on.
6. Approximately 20-45 minutes was allowed to completely disperse the gluten.
7. Sodium metabisulfite (0.2-1.0 lbs.) was added to the homogenous suspension.
8. The mixture was mixed for 1 hour.
9. The dispersion was pumped to the solids-ejecting centrifuge yielding a high-protein centrate and a dense residue rich in starch and other non-protein components.
10. The centrate was spray-dried into a wheat protein isolate powder with protein content greater than 90% (Nx6.25, dry basis), and neutral pH (5.0-7.0).

Example 19

1. The process configuration used in this Example is illustrated schematically in FIG. 16.
2. Water (300 gallons, 95° F.) was transferred to a tank equipped with a homogenizing mixer.
3. Ammonium hydroxide or ammonia water (0.2% based on wet gluten) was added to adjust the pH to 10-11.
4. 2,600 lbs. of wet gluten (30-33% solids) from the dewatering press (130) of FIGS. 1-4 was added.
5. The homogenizing mixer was turned on.
6. Approximately 20-45 minutes was allowed to completely disperse the gluten.

7. Sodium metabisulfite (0.2-1.0 lbs.) and sodium ascorbate (1-3 lbs.) were added to the homogeneous suspension.
8. The mixture was mixed for 1 hour.
9. The homogeneous suspension was pumped into a solids-ejecting centrifuge where the high-protein centrate was separated from the dense residue containing starch and other non-protein components.
10. The centrate was spray-dried into a wheat protein isolate powder with a protein content greater than 90% protein (Nx6.25, dry basis), and neutral pH (5.0-7.0).

Example 20

1. The process configuration used in this Example is illustrated schematically in FIG. 16.
2. Hot water (420 gallons, 120-130° F.) was transferred to a tank equipped with a homogenizing mixer.
3. Lactic acid (11.5 lbs) was added.
4. The homogenizing mixer was turned on.
5. 2,100 lbs. of wet gluten (30-33% solids) from the dewatering press (130) of FIGS. 1-4 was added.
6. Approximately 20-45 minutes was allowed to completely disperse the gluten.
7. 1.5 lbs. of Liquipanol enzyme (papain) was added.
8. The mixture was stirred for 1 hour.
9. The dispersion was then pumped into a solids-ejecting centrifuge to separate the high-protein centrate from the dense residue rich in starch and other non-protein components.
10. The centrate was passed through a hydroheater (200-210° F., 20-minute retention time) to deactivate the enzyme.
11. The dispersion was then spray-dried into a wheat protein isolate powder with protein content greater than 90% (Nx6.25, dray basis), and pH of 4.0-4.5.

Example 21

1. The process configuration used in this Example is illustrated schematically in FIG. 16.
2. Hot water (280 gallons, 120-130° F.) was transferred to a tank equipped with a homogenizing mixer.
3. 50% sodium hydroxide solution (11 lbs.) was added.
4. The homogenizing mixer was turned on.
5. 3,500 lbs. of wet gluten (30-33% solids) from the dewatering press (130) of FIGS. 1-4 was added.
6. Approximately 20-45 minutes was allowed to completely disperse the gluten.
7. 4.5 lbs. of Alcalase enzyme and 7.0 lbs. of Protamex enzyme were added to the slurry.
8. The mixture was stirred for 1 hour.
9. The dispersion was then pumped into a solids-ejecting centrifuge to separate the high-protein centrate from the dense residue rich in starch and other non-protein components.
10. The centrate was passed through a hydroheater (200-210° F., 20-minute retention time) to deactivate the enzymes.
11. The dispersion was then spray-dried into a wheat protein isolate powder with protein content greater than 90% (Nx6.25, dry basis), and pH of 4.5-6.5.

Example 22

1. The process configuration used in this Example is illustrated schematically in FIG. 16.
2. Hot water (210 gallons, 120-130° F.) was transferred to a tank equipped with a homogenizing mixer.
3. Ammonium hydroxide or ammonia water (0.2% based on wet gluten) was added to adjust the pH to 10-11.
4. The homogenizing mixer was turned on.
5. 3,500 lbs. of wet gluten (30-33% solids) from the dewatering press (130) of FIGS. 1-4 was added.
6. Approximately 20-45 minutes was allowed to completely disperse the gluten.
7. Alcalase enzyme (10 lbs.) was added.
8. The dispersion was mixed for 1 hour.
9. The dispersion was then pumped into a solids-ejecting centrifuge to separate the high-protein centrate from the dense residue rich in starch and other non-protein components.
10. The centrate was passed through a hydroheater (200-210° F., 20-minute retention time) to deactivate the enzyme.
11. The slurry was then spray-dried into a wheat protein isolate powder with greater than 90% protein (Nx6.25, dry basis) and pH of 4.5-6.5.

Example 23

Figure 17:
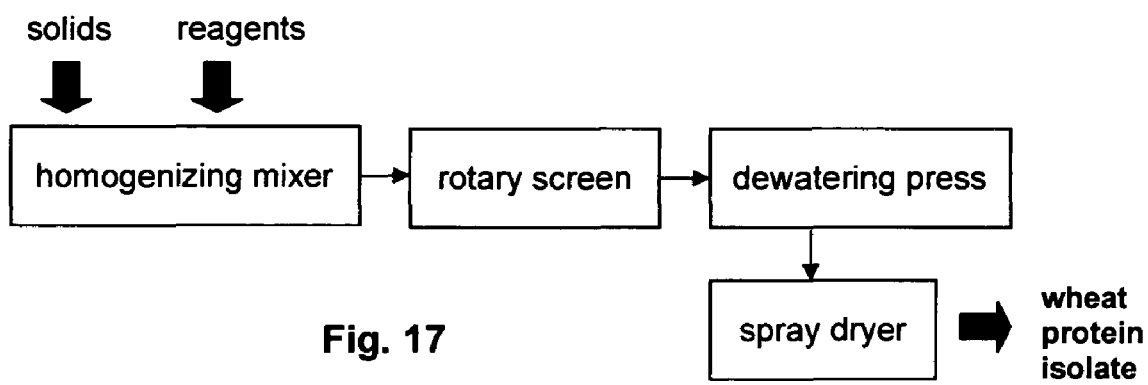
FIG. 17 depicts schematically further process improvements using a homogenizing mixer, a rotary screen, a dewatering press and a spray dryer.

1. The process configuration used in this Example is illustrated schematically in FIG. 17.
2. Water (300 gallons, 95° F.) was transferred to a tank equipped with a homogenizing mixer.
3. Ammonium hydroxide or ammonia water (0.2% based on wet gluten) was added to adjust the pH to 10-11.
4. 2,600 lbs. of wet gluten (30-33% solids) from the dewatering press (130) of FIGS. 1-4 was added.
5. The homogenizing mixer was turned on.
6. Approximately 20-45 minutes was allowed to completely disperse the gluten.
7. Sodium metabisulfite (0.2-1.0 lbs.) and sodium ascorbate (1-3 lbs.) were added to the homogeneous suspension.
8. The mixture was mixed for 1 hour.
9. The alkaline suspension was treated with lactic acid or other organic acids to adjust the pH to 6.0-7.0.
10. The coagulated protein was recovered using a rotary screen, then dewatered in a press, and subsequently flash-dried.
11. The resulting powder is a wheat protein isolate with greater than 90% protein content (Nx6.25, dry basis), and pH of 5.0-7.0.

Example 24

1. The process configuration used in this Example is illustrated schematically in FIG. 17.
2. Water (422 gallons, 95° F.) was transferred to a tank equipped with a homogenizing mixer.
3. Ammonium hydroxide or ammonia water (0.2% based on wet gluten) was added to adjust the pH to 10-11.
4. 2,500 lbs. of wet gluten (30-33% solids) from the dewatering press (130) of FIGS. 1-4 was added.
5. The homogenizing mixer was turned on.
6. Approximately 20-45 minutes was allowed to completely disperse the gluten.
7. Sodium metabisulfite (0.2-1.0 lbs.) was added to the homogenous suspension.
8. The mixture was mixed for 1 hour.
9. The metabisulfite-treated dispersion was treated with lactic acid or other organic acids until the pH drops to 6.0-7.0.

10. The coagulated protein was collected using a rotary screen, dewatered in a press, and then flash-dried.
11. The resulting powder is a wheat protein isolate with greater than 90% protein (Nx6.25, dry basis), and a pH of 5.0-7.0.

Example 25

1. The process configuration used in this Example is illustrated schematically in FIG. 17.
2. Water (422 gallons, 95° F.) was transferred to a tank equipped with a homogenizing mixer.
3. Ammonium hydroxide or ammonia water (0.2% based on wet gluten) was added to adjust the pH to 10-11.
4. 2,500 lbs. of wet gluten (30-33% solids) from the dewatering press (130) of FIGS. 1-4 was added.
5. The homogenizing mixer was turned on.
6. Approximately 20-45 minutes was allowed to completely disperse the gluten.
7. The alkaline suspension was treated with lactic acid or other organic acids to adjust the pH to 6.0-7.0.
8. The coagulated protein was recovered using a rotary screen, then dewatered in a press, and subsequently flash-dried.
9. The resulting powder is a wheat protein isolate with greater than 90% protein content (Nx6.25, dry basis), and pH of 5.0-7.0.

Example 26

1. The process configuration used in this Example is illustrated schematically in FIG. 17.
2. 240 gallons of water (95° F.) was transferred to a tank equipped with a homogenizing mixer.
3. 36.5 lbs. of lactic acid (88%) was added (pH 3.8-4.2).
4. The homogenizing mixer was turned on.
5. 2,800 lbs. of wet gluten (30-33% solids) from the dewatering press (130) of FIGS. 1-4 was added. The homogenizing mixer cuts, chops, and shears the gluten into tiny particles.
6. Around 20-45 minutes was allowed for complete dispersion of gluten.
7. Sodium metabisulfite (1-3 lbs.) was added, and the dispersion was mixed for 60 minutes.
8. Sodium hydroxide solution (50%) was added to the dispersion to adjust the pH to 6.0-7.0 resulting in protein coagulation.
9. The coagulated protein was recovered using a rotary screen, then dewatered in a press, and subsequently flash-dried.
10. The resulting powder is a wheat protein isolate with a neutral pH (6.0-7.0), and greater than 90% protein (Nx6.25, dry basis).

Example 27

Figure 18:
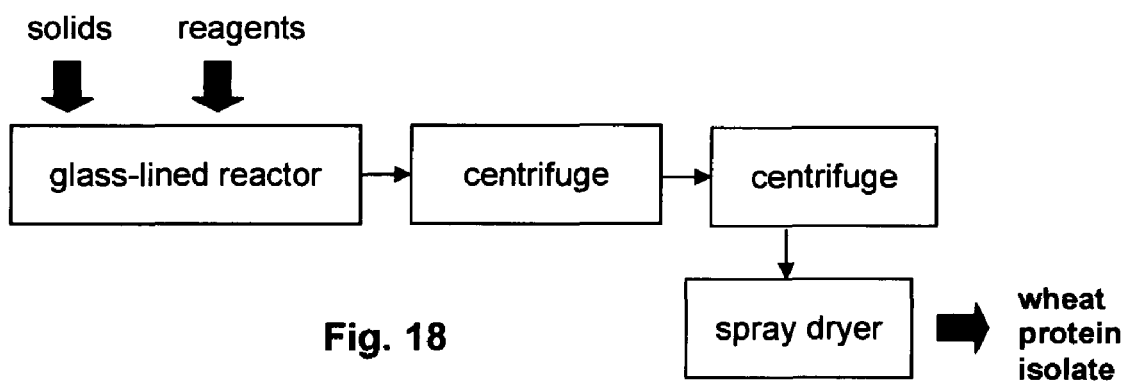
FIG. 18 depicts schematically further process improvements using a glass-lined reactor, a centrifuge(s) and a spray dryer.

1. The process configuration used in this Example is illustrated schematically in FIG. 18.
2. 2,400 lbs of re-agglomerated protein (30-33% solids) from Step 3 of Example 28, wet gluten from the dewatering press (130) of FIGS. 5-10, or wet gluten from the dewatering press (120) of FIG. 12 was added to the glass-lined reactor containing 290 gallons of water.
3. 36 lbs. of concentrated hydrochloric acid was added.
4. The mixture was mixed to form a slurry.
5. The slurry was heated to 203° F., and kept at that temperature for 3.5 hours.
6. After 3.5 hours, the slurry was cooled to 115° F.
7. The pH was adjusted to 3.5-3.6 using 50% caustic solution.
8. The slurry was processed in a solids-ejecting centrifuge to collect the cake.
9. The cake was re-suspended in fresh water, and re-centrifuged.
10. The washed cake is re-suspended again in fresh water.
11. The pH was adjusted to 6.8-7.0 using 50% caustic solution.
12. The slurry was spray dried to yield a wheat protein isolate with greater than 90% protein (Nx6.25, dry basis).

Example 28

1. Wet gluten from the dewatering press (130) of FIGS. 1-4 was continuously pumped into a homogenizing mixer together with water.
2. In the homogenizing mixer, the gluten was chopped into small pieces and forced into a set of screen that releases the starch from the protein matrix and aligns the protein into fiber-like structures.
3. The "cold extruded" mass was pumped into a dewatering press that re-agglomerates the protein and squeezes out the starch.
4. The highly purified protein (30-33% solids) was flash-dried into a wheat protein isolate powder with greater than 90% protein content (Nx6.25, dry basis), and neutral pH (5.0-7.0).

Example 29

1. Wheat protein isolate powder from FIGS. 5-12 or from Examples 1-11, 15-10, 22-26 and 28 was heated in an oven, autoclave, or heated blender for 0.5-1.5 hours at 100-1300 C.
2. The product was cooled to room temperature.
3. The wheat protein isolate powder exhibits no vitality (devitalized) and has a protein content greater than 90% (Nx6.25, dry basis).

Example 30

1. Wheat protein isolate powder from FIGS. 5-12 or from Examples 1-21 was processed in a Wenger TX-85 twin-screw extruder to texturize the protein into a meat-like, fibrous product.
2. The extrudate was converted into a chunk, flake, chip, cube, granular, or powder form.

The dry extrudate has a meat-like texture, and possesses no vitality.

The detailed description of the drawings set forth above and the various process configurations described in that detailed description do not, cannot, and are not intended to limit the scope of this application or any patent that issues from this application. The sole measure of the scope of this application is the claims that follow, as expanded by the Doctrine of Equivalents to the extent permitted by law.

We claim:
1. A process for producing wheat protein isolate comprising the following steps:
   mixing flour with water;
   separating gluten from the mixture by a screened separating apparatus wherein a stream of water exiting a nozzle under a pressure of at least 80-100 psi is discharged within 12-18 inches of the separating apparatus screen;

dewatering said gluten in dewatering apparatus;
dispersing said gluten; and
drying said dispersed gluten.

2. The process of claim 1 wherein said gluten is separated by centrifuge after said dispersing step and before said drying step.

3. The process of claim 1 wherein said gluten is dewatered in dewatering apparatus after said dispersing step and before said drying step.

4. The process of claim 1 wherein a reducing agent is introduced in the dispersing step.

5. The process of claim 4 wherein the reducing agent is a bisulfite composition.

6. The process of claim 1 wherein lactic acid is introduced in the dispersing step.

7. The process of claim 1 wherein ammonia is introduced in the dispersing step.

8. A process for producing wheat protein isolate comprising the following steps:
    mixing flour with water;
    separating gluten from the mixture in a screened separating apparatus;
    dewatering said gluten in a screened dewatering apparatus;
    recirculating said gluten with an organic acid in a tank with a recirculation pump; and
    drying said recirculated gluten;
    wherein a stream of high pressure wash water exiting a nozzle under a pressure of at least 80-100 psi is discharged within 12-18 inches of the separating apparatus screen.

9. The process of claim 8 wherein a stream of high pressure wash water exiting a nozzle under a pressure of at least 80-100 psi is discharged within 12-18 inches of the dewatering apparatus screen.

10. A process for producing wheat protein isolate comprising the following steps:
    mixing flour with water;
    separating gluten from the mixture with a screened separating apparatus;
    dewatering said gluten with a screened dewatering apparatus;
    homogenizing said gluten;
    hydroheating said gluten; and
    drying said homogenized and hydroheated gluten;
    wherein a stream of high pressure wash water exiting a nozzle under a pressure of at least 80-100 psi is discharged within 12-18 inches of the separating apparatus screen.

11. The process of claim 10 wherein a stream of high pressure wash water exiting a nozzle under a pressure of at least 80-100 psi is discharged within 12-18 inches of the dewatering apparatus screen.

12. The process of claim 10 wherein said gluten is separated by centrifuge after said homogenizing step and before said drying step.

13. The process of claim 10 wherein said gluten is rotary screened and dewatered after said homogenizing step and before said drying step.

14. The process of claim 13 wherein a stream of high pressure wash water exiting a nozzle under a pressure of at least 80-100 psi is discharged within 12-18 inches of the dewatering apparatus screen.

15. A process for producing wheat protein isolate comprising the following steps:
    mixing flour and water;
    separating gluten from said mixture using a screened separation apparatus wherein a
    stream of high pressure wash water exiting a nozzle under a pressure of at least 80-100 psi is discharged within 12-18 inches of the separation apparatus screen;
    reacting said gluten with acid;
    separating said gluten by centrifuge; and
    drying said separated gluten.

16. The process of claim 15 wherein the flour is wheat flour.

17. A process for producing wheat protein isolate comprising the following steps:
    mixing flour and water;
    separating gluten from the mixture in a screened separating apparatus;
    dewatering said gluten in first-screened dewatering apparatus wherein a stream of high pressure wash water exiting a nozzle under a pressure of at least 80-100 psi is discharged within 12-18 inches of the dewatering apparatus screen;
    mixing said gluten;
    dewatering said gluten in second screened dewatering apparatus; and
    drying said dewatered gluten.

18. The process of claim 17 wherein high pressure wash water is introduced in the separating step wherein a stream of high pressure wash water exiting a nozzle under a pressure of at least 80-100 psi is discharged within 12-18 inches of the separating apparatus screen.

19. The process of claim 17 wherein a stream of high pressure wash water exiting a nozzle under a pressure of at least 80-100 psi is discharged within 12-18 inches of the second dewatering apparatus screen.

20. The process of claim 17 wherein the first step of dewatering is followed by homogenizing.

21. The process of claim 17 wherein the first step of dewatering is followed by kneading.

22. The process of claim 21 wherein the second dewatering of said gluten comprises the following steps:
    dewatering said gluten by screen; and
    dewatering said gluten by press.

23. A process for producing wheat protein isolate comprising the following steps:
    mixing flour with water in screened mixing apparatus; and
    separating gluten from the mixture with a stream of high pressure wash water exiting a nozzle under a pressure of at least 80-100 psi is discharged within 12-18 inches of the mixing apparatus screen.

24. A process for producing wheat protein isolate comprising the following steps:
    mixing flour with water; and
    dewatering gluten in screened dewatering apparatus with a stream of high pressure wash water exiting a nozzle under a pressure of at least 80-100 psi is discharged within 12-18 inches of the dewatering apparatus screen.

25. The process of claim 24 wherein the flour is wheat flour.

26. A process for producing wheat protein isolate comprising the following steps:
    mixing flour with water;
    separating gluten from the mixture by a separating apparatus;
    dewatering said gluten in dewatering apparatus;
    dispersing said gluten; and
    drying said dispersed gluten;
    wherein a reducing agent is introduced in the dispersing step and the reducing agent is a bisulfite composition.

27. The process of claim 26 wherein said gluten is separated by centrifuge after said dispersing step and before said drying step.

28. The process of claim 26 wherein said gluten is dewatered in dewatering apparatus after said dispersing step and before said drying step.

29. The process of claim 26 wherein lactic acid is introduced in the dispersing step.

30. The process of claim 26 wherein ammonia is introduced in the dispersing step.

31. A process for producing wheat protein isolate comprising the following steps:
mixing flour with water;
separating gluten from the mixture by a separating apparatus;
dewatering said gluten in dewatering apparatus;
dispersing said gluten; and
drying said dispersed gluten;
wherein lactic acid is introduced in the dispersing step.

32. The process of claim 31 wherein said gluten is separated by centrifuge after said dispersing step and before said drying step.

33. The process of claim 31 wherein said gluten is dewatered in dewatering apparatus after said dispersing step and before said drying step.

34. The process of claim 31 wherein a reducing agent is introduced in the dispersing step.

35. The process of claim 31 wherein the reducing agent is a bisulfite composition.

36. The process of claim 31 wherein ammonia is introduced in the dispersing step.

37. A process for producing wheat protein isolate comprising the following steps:
mixing flour with water;
separating gluten from the mixture in a screened separating apparatus;
dewatering said gluten in a screened dewatering apparatus;
recirculating said gluten with an organic acid in a tank with a recirculation pump; and
drying said recirculated gluten;
wherein a stream of high pressure wash water exiting a nozzle under a pressure of at least 80-100 psi is discharged within 12-18 inches of the dewatering apparatus screen.

38. The process of claim 37 wherein a stream of high pressure wash water exiting a nozzle under a pressure of at least 80-100 psi is discharged within 12-18 inches of the separating apparatus screen.

39. A process for producing wheat protein isolate comprising the following steps:
mixing flour with water;
separating gluten from the mixture with screened separating apparatus;
dewatering said gluten with screened dewatering apparatus;
homogenizing said gluten;
hydroheating said gluten; and
drying said homogenized and hydroheated gluten;
wherein a stream of high pressure wash water exiting a nozzle under a pressure of at least 80-100 psi is discharged within 12-18 inches of the dewatering apparatus screen.

40. The process of claim 39 wherein a stream of high pressure wash water exiting a nozzle under a pressure of at least 80-100 psi is discharged within 12-18 inches of the separating apparatus screen.

41. The process of claim 39 wherein said gluten is separated by centrifuge after said homogenizing step and before said drying step.

42. The process of claim 39 wherein said gluten is rotary screened and dewatered after said homogenizing step and before said drying step.

43. The process of claim 42 wherein a stream of high pressure wash water exiting a nozzle under a pressure of at least 80-100 psi is discharged within 12-18 inches of a dewatering apparatus screen.

44. A process for producing wheat protein isolate comprising the following steps:
mixing flour with water;
separating gluten from the mixture with screened separating apparatus;
dewatering said gluten with screened dewatering apparatus;
homogenizing said gluten;
hydroheating said gluten; and
drying said homogenized and hydroheated gluten;
wherein said gluten is rotary screened and dewatered after said homogenizing step and before said drying step; and
wherein a stream of high pressure wash water exiting a nozzle under a pressure of at least 80-100 psi is discharged within 12-18 inches of the dewatering apparatus screen.

45. The process of claim 44 wherein a stream of high pressure wash water exiting a nozzle under a pressure of at least 80-100 psi is discharged within 12-18 inches of the separating apparatus screen.

46. The process of claim 44 wherein a stream of high pressure wash water exiting a nozzle under a pressure of at least 80-100 psi is discharged within 12-18 inches of the dewatering apparatus screen.

47. The process of claim 44 wherein said gluten is separated by centrifuge after said homogenizing step and before said drying step.

* * * * *